(12) United States Patent
Schwartz et al.

(10) Patent No.: US 12,149,403 B2
(45) Date of Patent: Nov. 19, 2024

(54) SWITCH MONITORING SYSTEM AND METHOD OF USE

(71) Applicant: RAZBERI SECURE TECHNOLOGIES, LLC, Las Vegas, NV (US)

(72) Inventors: Stephen Louis Schwartz, Plano, TX (US); Joseph Paul Vidunas, Durango, CO (US)

(73) Assignee: Razberi Secure Technologies, LLC, Las Vegas, NV (US)

( * ) Notice: Subject to any disclaimer, the term of this patent is extended or adjusted under 35 U.S.C. 154(b) by 0 days.

(21) Appl. No.: 18/244,605

(22) Filed: Sep. 11, 2023

(65) Prior Publication Data

US 2024/0137266 A1 Apr. 25, 2024
US 2024/0235926 A9 Jul. 11, 2024

Related U.S. Application Data

(63) Continuation of application No. 16/517,326, filed on Jul. 19, 2019, now Pat. No. 11,757,706.

(51) Int. Cl.
| | |
|---|---|
| *H04L 41/0681* | (2022.01) |
| *H04J 3/14* | (2006.01) |
| *H04L 41/0213* | (2022.01) |
| *H04L 41/0659* | (2022.01) |
| *H04L 43/0888* | (2022.01) |
| *H04N 17/00* | (2006.01) |

(52) U.S. Cl.
CPC ............ *H04L 41/0681* (2013.01); *H04J 3/14* (2013.01); *H04L 41/0213* (2013.01); *H04L 41/0661* (2023.05); *H04L 43/0888* (2013.01); *H04N 17/004* (2013.01)

(58) Field of Classification Search
None
See application file for complete search history.

(56) References Cited

U.S. PATENT DOCUMENTS

| | | | | |
|---|---|---|---|---|
| 4,216,489 | A * | 8/1980 | Clemens | H10B 12/30 |
| | | | | 257/297 |
| 9,571,800 | B2 * | 2/2017 | Carey | H04N 21/2743 |
| 9,691,491 | B2 * | 6/2017 | Schwartz | G11C 5/147 |
| 10,469,806 | B2 * | 11/2019 | Cai | H04N 7/188 |
| 2002/0113877 | A1 * | 8/2002 | Welch | B66B 27/00 |
| | | | | 348/148 |
| 2004/0221218 | A1 * | 11/2004 | Grob | H04L 1/1887 |
| | | | | 714/748 |
| 2004/0250288 | A1 * | 12/2004 | Palmerio | G08B 13/19645 |
| | | | | 348/E7.086 |
| 2006/0077254 | A1 * | 4/2006 | Shu | G08B 13/19682 |
| | | | | 348/E7.086 |
| 2007/0013776 | A1 * | 1/2007 | Venetianer | H04N 5/76 |
| | | | | 348/E7.086 |

(Continued)

*Primary Examiner* — Christopher T Wyllie
(74) *Attorney, Agent, or Firm* — Troutman Pepper Hamilton Sanders LLP; James E. Schutz; Mark Lehi Jones

(57) ABSTRACT

A system is disclosed that monitors endpoints such as video cameras and audio devices for malfunction through a novel TDMA device allocation format. The system isolates and analyzes a set of groups of video streams in a rotating and recurring fashion and generates alerts and remedial commands based on the analysis. The system also provides endpoint management functions such as password analysis and firewall functions.

24 Claims, 16 Drawing Sheets

(56) References Cited

U.S. PATENT DOCUMENTS

| | | | | |
|---|---|---|---|---|
| 2007/0052804 A1* | 3/2007 | Money | H04N 7/181 | 348/E7.086 |
| 2009/0031381 A1* | 1/2009 | Cohen | H04L 67/125 | 725/115 |
| 2009/0167527 A1* | 7/2009 | Wang | H04N 7/181 | 348/61 |
| 2009/0262189 A1* | 10/2009 | Marman | G08B 13/19613 | 348/143 |
| 2009/0263772 A1* | 10/2009 | Root | G09B 19/0038 | 434/247 |
| 2010/0107225 A1* | 4/2010 | Spencer | H04W 12/069 | 726/4 |
| 2011/0090334 A1* | 4/2011 | Hicks, III | G08B 13/19658 | 379/44 |
| 2011/0273563 A1* | 11/2011 | Murphy | H04N 7/18 | 348/143 |
| 2011/0273567 A1* | 11/2011 | Bhan | H04N 7/181 | 348/E7.085 |
| 2012/0313781 A1* | 12/2012 | Barker | H04N 7/185 | 348/E5.024 |
| 2014/0085480 A1* | 3/2014 | Saptharishi | H04N 21/23113 | 348/159 |
| 2014/0267752 A1* | 9/2014 | Huang | G08B 13/19669 | 348/159 |
| 2015/0047024 A1* | 2/2015 | Park | G06Q 30/0645 | 726/19 |
| 2015/0081721 A1* | 3/2015 | Ptitsyn | H04N 21/8456 | 707/748 |
| 2015/0124631 A1* | 5/2015 | Edsall | H04L 43/026 | 370/252 |
| 2015/0138365 A1* | 5/2015 | Hsieh | H04N 5/77 | 348/159 |
| 2015/0215583 A1* | 7/2015 | Chang | H04N 7/181 | 348/159 |
| 2015/0295946 A1* | 10/2015 | Tang | H04L 65/80 | 726/22 |
| 2015/0327195 A1* | 11/2015 | Chiu | H04B 7/15507 | 370/350 |
| 2015/0373705 A1* | 12/2015 | Yamasaki | H04W 74/04 | 370/336 |
| 2016/0044283 A1* | 2/2016 | Vourkoutiotis | G08B 25/08 | 348/143 |
| 2016/0219088 A1* | 7/2016 | Ma | H04L 65/765 | |
| 2017/0214712 A1* | 7/2017 | Maxwell | H04L 63/1441 | |
| 2018/0012460 A1* | 1/2018 | Heitz, III | G08B 13/19682 | |
| 2018/0315301 A1* | 11/2018 | Subramanian | G06F 3/0481 | |
| 2019/0095076 A1* | 3/2019 | Takehara | H04N 17/00 | |
| 2019/0098248 A1* | 3/2019 | Takehara | H04N 7/181 | |
| 2019/0149540 A1* | 5/2019 | Shimazu | H04W 12/06 | 726/4 |
| 2019/0174444 A1* | 6/2019 | Li | H04W 56/0015 | |
| 2020/0120313 A1* | 4/2020 | LaCroix | H04L 67/5682 | |
| 2020/0178045 A1* | 6/2020 | Sung | H04W 4/10 | |

* cited by examiner

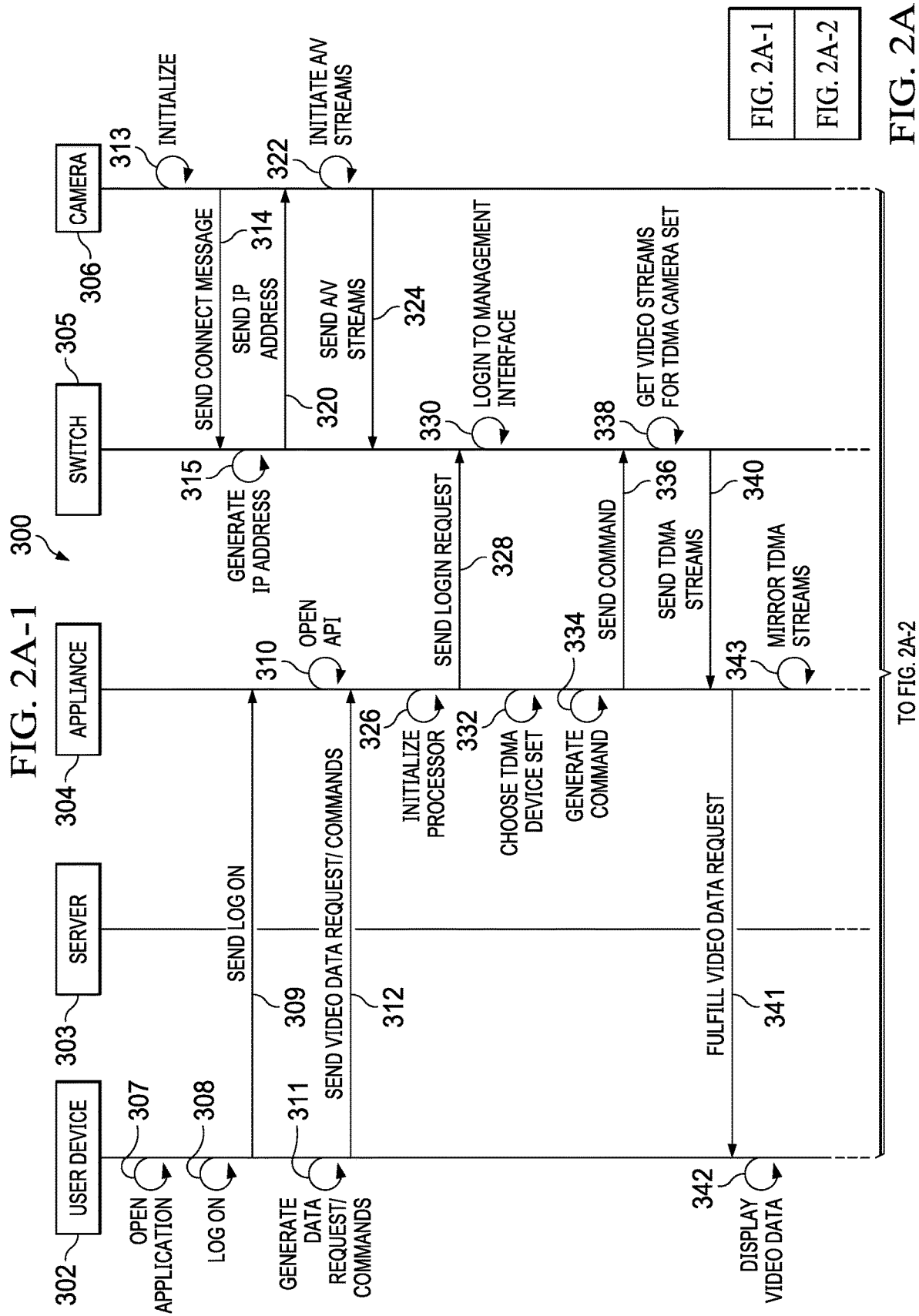

SWITCH MONITORING SYSTEM AND METHOD OF USE

CROSS REFERENCE TO RELATED APPLICATIONS

This application is a Continuation application claiming priority under 35 U.S.C. § 120 to U.S. patent application Ser. No. 16/517,326, filed Jul. 19, 2019, and issued as U.S. Pat. No. 11,757,706 on Sep. 12, 2023, the contents of which are incorporated herein by reference in its entirety as if presented in full.

FIELD OF THE INVENTION

This disclosure relates to monitoring audio/video switches to determine camera and endpoint malfunctions.

BACKGROUND OF THE INVENTION

Modern video surveillance systems often have many hundreds or thousands of cameras that are intended to be continuously active. Each audio and video stream from these cameras, or other endpoints, is continuously recorded by a network video recorder, or a bank of network video recorders. A continuous video record is often required from all of the cameras. For example, high security applications such as banks, casinos, hospitals and airports often require an uninterrupted video and audio record from each camera 24 hours a day. In some instances, camera malfunction occurs rendering video unavailable. The difficulty occurs in recognizing camera failure and correcting it before a significant amount of data is lost.

Camera malfunctions occur due to a number of reasons. For example, a camera can be intentionally or unintentionally directed to a incorrect field of view or have its view obstructed. Further, technical malfunctions often degrade the video signal received to the point where it is unusable. Similarly, camera malfunctions such as sync loss, focus setting, iris setting or color settings can result further degrading of video image. Likewise, complete loss of a video or audio signal occurs when catastrophic camera failure is present.

In order to recognize and correct camera malfunctions, the prior art has developed manual systems whereby an administrator preemptively maintains each of the video cameras. As can be expected, for large networks of cameras this manual task is time consuming and error prone.

Likewise, the prior art has also provided many automated solutions which attempt to detect camera malfunctions and correct them. However, these prior art systems often require prohibitively large processors and/or prohibitively large processing overhead. Hence, the monitoring that occurs in the prior art systems is generally limited to image analysis or application layer analysis, which still requires expensive processing hardware.

For example, U.S. Pat. No. 6,727,490 to Medard, et al., discloses a system for detecting malfunctions in optical devices. The system requires "wrapper" devices to be installed at any device that receives input signals and output signals. The "wrapper" device compares a function of the input signal and the output signal to a set of predetermined parameters and determines a malfunction condition exists, such as jamming, due to an unexpected difference in the result of the comparison. The use of "wrapper" devices on any input/output device requires significant strain on resources, including cost, installation, and maintenance.

By way of another example, U.S. Pat. No. 8,908,033 to Lehane, et al., discloses a system that relies on a failure to receive presence information to determine a surveillance node malfunctioned and to adjust another node, such as by adjusting a zoom or tilt angle, to accommodate the lack of presence of the malfunctioning node. The system assures continuous field of coverage, but also fails to alleviate processor strain.

By way of another example, U.S. Pat. No. 7,683,934 to Montminy, et al. discloses a system for monitoring camera malfunctions by comparing current camera health records to a stored set of records for the cameras in normal operation. The system provides a report of malfunctioning cameras, but requires extremely high processing capability to monitor multiple video streams.

The prior art fails to disclose or suggest a system that is capable of monitoring large number of video data streams in a manner that accurately determines malfunctions while reducing processing overhead. Therefore, there is a need for a simple and cost-effective system for monitoring a large number of video cameras and other endpoint devices simultaneously that reduces required processing time and hardware expense and complexity.

SUMMARY OF THE INVENTION

In a preferred embodiment, an appliance as disclosed is connected to a third party managed switch, such as a video switch, which is in turn connected to a number of cameras and other endpoint devices. The appliance is configured to determine whether or not the cameras and endpoints connected to ports of the switch are malfunctioning. The appliance groups the cameras and analyzes video streams for malfunctions for each group in sequence in a time division multiple access (TDMA) format. The TDMA format ensures that the processor is not overburdened or overly expensive. When a malfunction is detected, the appliance sends a notification to a user device.

In a preferred embodiment, the appliance may be integrated with a network video recorder. The network video recorder provides video monitoring and alerting, connection monitoring and alerting, and audio monitoring and alerting.

Once configured, the appliance can provide an API-accessible web management interface and an event manager. The event manager receives video streams from the cameras and generates rule violation events and alarms. The events and alarms are sent according to instructions from a scheduler. Subsequently, notifications are generated and sent to the web interface. The API also provides user interactions with the alarm transactions.

In a preferred embodiment, the system further provides a user device having client software installed in memory. The software supports live camera connection monitoring and alerting, video monitoring and alerting, and audio connection monitoring and alerting.

DETAILED DESCRIPTION

Figure 1:
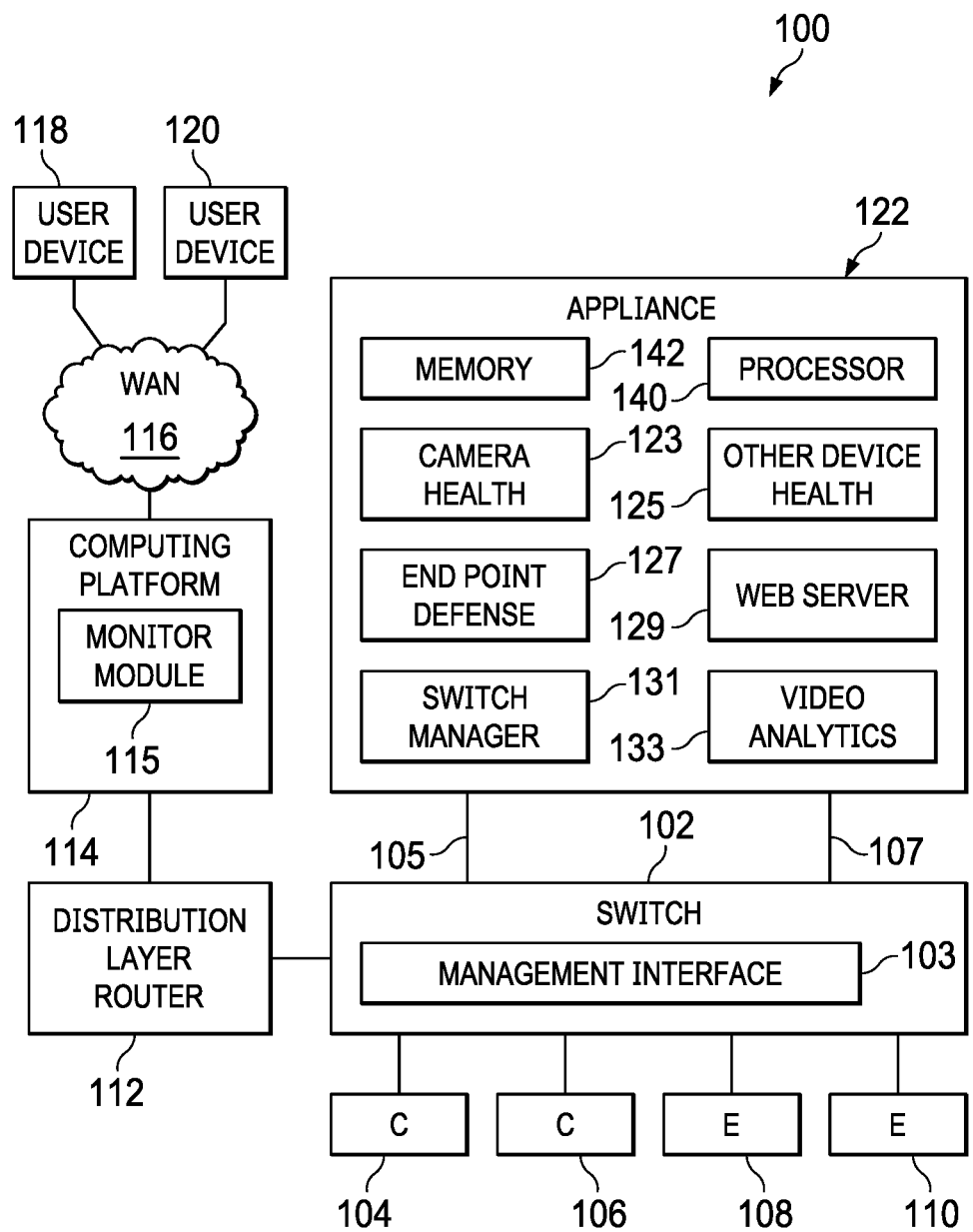
FIG. 1 is an architecture diagram showing a preferred network of security devices and an appliance of a preferred embodiment.

Referring then to FIG. 1, network video system 100 will be described. Switch 102 is a video router or an SDI router designed to route video signals from multiple input sources such as cameras, computers, and DVD players to one or more display devices such monitors or projectors. In this case, switch 102 is connected to cameras 104 and 106 and end point devices 108 and 110. End point devices 108 and 110 further include IP Wifi and smart devices, such as cameras, video doorbells, motion sensors, motion activated flood lights, alarms and other similar IP client devices. The number of cameras and endpoints shown is exemplary. In other embodiments, several hundred cameras and endpoints may be connected with the system. In a preferred embodiment, switch 102 is a power over ethernet (POE) switch having 24 ports. Examples of switch 102 include a Miranda P3 router or Cisco Systems router. In a preferred embodiment, switch 102 runs a Linux based operating system and includes on-board management interface 103. On-board management interface 103 can be controlled through management port 105 or monitor port 107 through a command line interface.

Switch 102 is also connected to distribution layer router 112. In a preferred embodiment, distribution layer router 112 includes layer 2 and layer 3 features which enable fast packet routing.

Distribution layer router 112 is connected to computing platform 114. Computing platform 114 is comprised of a video network recorder including a microprocessor, memory, bios flash memory, solid state disk drive, SATA hard disk drive and multiple power over ethernet enabled network interface ports. Computing platform 114 includes monitor module 115. In a preferred embodiment, monitor module 115 is controlled software which implements a video recording service to capture video streams from attached RJ-45 ports or fiber (SFP) ports. Video streams are stored on disk drives attached to an internal SATA connection, external SATA port or network attached storage devices. In a preferred embodiment, monitor module 115 collects system data and transmits it to client devices which, in turn, maintain a repository of all entities in the system and perform analytics for the computing platform.

Computing platform 114 is connected to wide area network 116, such as the Internet. Wide area network 116 is connected to user devices 118 and 120. In a preferred embodiment, user devices 118 and 120 can include of tablets, smart phones, PC workstations or other similar mobile computing devices. The number of user devices is exemplary, and can vary. In use, the computing platform receives instructions from user devices 118 and 120 related to preferences with respect to configuration of the network system.

Switch 102 is further connected to appliance 122, through management port 105 and monitor port 107.

Appliance 122 is tasked with TDMA resource allocation functions. Appliance 122 comprises processor 140 operatively connected to memory 142. In a preferred embodiment, the processor could include a Zenon E3-1275V3 processor available from Intel Corporation of Santa Clara, California. Other similar processors may also be employed. Memory 142 is preferably a static random access memory which includes common buffer memory pool for holding data packets and a sub-data packets.

The memory contains several modules which, when instantiated by the processor, are tasked with monitoring decapsulated, mirrored packet slices to determine layer 2, layer 3, and layer 4 abnormalities and camera and endpoint device malfunctions. In a preferred embodiment, memory 142 includes camera health module 123, other device health module 125, end point defense module 127, webserver module 129, service manager module 131 and video analytics module 133.

Camera health module 123 monitors camera and end point traffic and provides a report when the quality of video, audio or other streaming protocols is degraded, as will be further described. Similarly, other device health module 125 functions to monitor traffic and report alerts when quality of devices other than cameras is degraded.

End point defense module 127 functions to automate cybersecurity related tasks such as loading traffic from specific mac addresses, channeling traffic to specific UDP or TCP ports and performing password protection features, as will be further described.

Webserver module 129 functions to process incoming network requests over HTTP and other related protocol and generally stores processes and delivers webpages as requested.

Switch manager module 131 functions to communicate with management interface 103 through either management port 105 or monitor port 107. In a preferred embodiment, the switch manager module generates all command line instructions from the appliance to the switch.

Video analytics module 133 functions to assure media quality by examining properties such as bit rate and luminosity and can analyze video images to determine, among other things, movement of physical objects in the video field, as will be further described.

Figures 2, 2A:
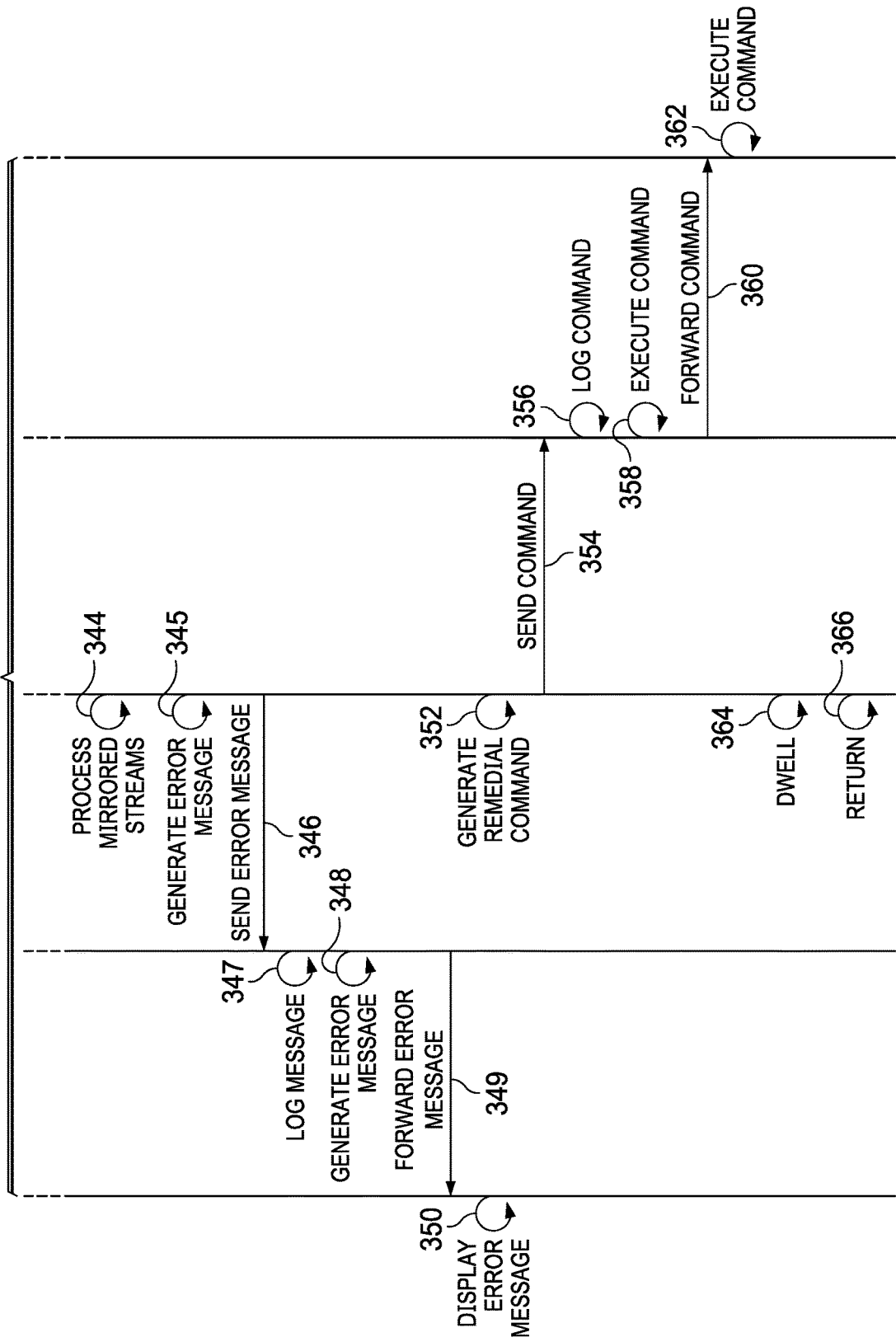
FIGS. 2A-2D are sequence diagrams for a preferred embodiment of handling transport layer abnormalities.

Referring then to FIG. 2A, a flowchart of the steps a preferred embodiment for the camera health module will be described.

At step 307, user device 302 opens a resident application. At step 308, user device 302 completes a logon entry form. At step 309, user device 302 sends a logon message to appliance 304. At step 310, appliance 304 opens an API through webserver 129.

At step 311, user device 302 generates a video data request and a command sequence. In a preferred embodiment, video data requests can include a request for live video streams, camera health information, malfunction information and disconnection information, as will be further described. Command sequences can include TDMA device set identification, time limits for various functions of the system, and requests for alerts, and predetermined counter settings, as will be further described. At step 312, user device 302 sends the video data request and command sequence to appliance 304.

At step 313, camera 306 is initialized. It is understood that camera 306 is exemplary and can be just one of many cameras and endpoints connected to the switch. At step 314, camera 306 sends a connect message to switch 305. At step 315, switch 305 generates an IP address. At step 320, the IP address is sent to camera 306. At step 322, camera 306 initiates audio video streams. At step 324, the audio video streams are sent to switch 305. At step 326, appliance 304 initializes the processor.

At step 328, appliance 304 sends a login request to the management interface of switch 305. At step 330, the login request is acknowledged by the management interface of switch 305. At step 332, appliance 304 chooses a TDMA device set.

By processing video samples in a TDMA manner, less processing time is required to determine changes in video and audio streaming data than the prior art.

The TDMA device set is typically a subgroup of the devices connected to the switch. The TDMA device set can include any number of cameras and end point devices. In one embodiment, the TDMA device set is chosen by the user and communicated to the appliance in the command sequence. In another embodiment, the TDMA device set is set by the appliance.

The command sequence to choose the TDMA device set in one embodiment is a "group divisor" by which the detected device count is divided, according to the following equation:

$$\text{Number of Groups} = \frac{\text{Device Count}}{\text{Group Divisor}} \quad \text{Eq. 1}$$

A small group divisor results in a larger number of groups of devices, with each group having a small number of devices. In this case, the cache or temporary memory requirements are relatively small because the processor only performs a statistical analysis on the metadata collected from the frames of a small number of devices at one time. Less processing capacity is required to perform statistical analysis with a smaller number of devices in each group because calculations are made for the devices in a single group at a time. However, a smaller group size also results in lower accuracy because the sampling time for each group is reduced.

A large group divisor results in a smaller number of groups, with each group having a larger number of devices. Required cache sizes and processing capabilities are relatively larger, but accuracy of the statistical analysis is higher. A smaller number of groups generally results a more accurate statistical analysis because sampling time per group is increased.

In another preferred embodiment, the command sequence to choose the TDMA device set is a "port increment divisor." A port increment divisor is the desired number of devices to be processed per cycle, according to the following equation:

$$\text{Port Increments} = \frac{\text{Device Count}}{\text{Port Increment Divisor}} \quad \text{Eq. 2}$$

The Ethernet frames are received based on the port increments. For example, if there are 24 devices and the port increment divisor is 4 devices processed per cycle, then the port increments value is 6 and so memory is dynamically allocated to receive just 6 header lengths per cycle.

In another preferred embodiment, the TDMA device set is designated by the appliance. In this case, the number of groups of devices is arbitrarily set at some integer number. Each group of devices includes an equal number of devices when the device count is even. When the device count is odd, one group will have a single extra device. The predetermined number of groups can be changed.

At step 334, appliance 304 generates a command to activate at least the TDMA device set. In an alternate embodiment, all devices are activated. At step 334, appliance 304 generates a command for the TDMA device set video streams. At step 336, the command is sent from appliance 304 to switch 305. At step 338, switch 305 isolates the video streams for the TDMA device set. At step 340, the isolated streams are sent to appliance 304 via monitoring port 107.

At step 341, appliance 304 fulfills the video data request and sends video data to user device 302. At step 342, the user device displays the video data, as will be further described.

At step 343, appliance 304 mirrors the TDMA video streams and parses and buffers the data for further processing. At step 344, appliance 304 processes the buffered data on a per TDMA group basis, and potentially reports an error message, as will be further described. In a preferred embodiment, data packets are examined to discover defective devices in the TDMA device set. For example, excessive reconnects, video loss and media and video quality are examined.

If an error message is reported, then at step 345, appliance 304 generates an error message. At step 346, the error message is sent from appliance 304 to server 303. At step 347, server 303 logs the error message. At step 348, server 303 generates an error message in the appropriate format. At step 349, the error message is sent to user device 302. In a preferred embodiment the message is in SMS format. However, other formats such as email, SNMP, email SNMP, syslog and MIMS may be employed. At step 350, user device 302 displays the error message in a GUI interface, as will be further described.

At step 352, appliance 304 generates a remedial command designed to correct the error reported in step 342. In one embodiment, an example of a remedial command is a camera restart. In another embodiment, an example of a remedial command is a command to increase the rate at which the switch polls, or requests information, from camera 306. In one embodiment, the port sampling rate is increased for a preset time period, such as 24 hours, and then decreased after the time period has expired. Other remedial commands will be further described.

At step 354, the remedial command is sent from appliance 304 to switch 305. At step 356, switch 305 logs the remedial command. At step 358, the switch executes the remedial command. For example, if a camera restart is required in a power over ethernet system, the switch generates a POE command to power down the camera and then returns power to it to effect a restart.

At step 360, the remedial command is forwarded from switch 305 to camera 306. At step 362, camera 306 executes the remedial command.

At step 364, appliance 304 repeats the preceding steps 344-362 for each of the mirrored streams until a predetermined time period has elapsed. At that time, at step 366, the appliance returns to step 332 to choose a next TDMA device set. The process continues, processing through each successive device in each successive TDMA device set until terminated.

Figure 2B:
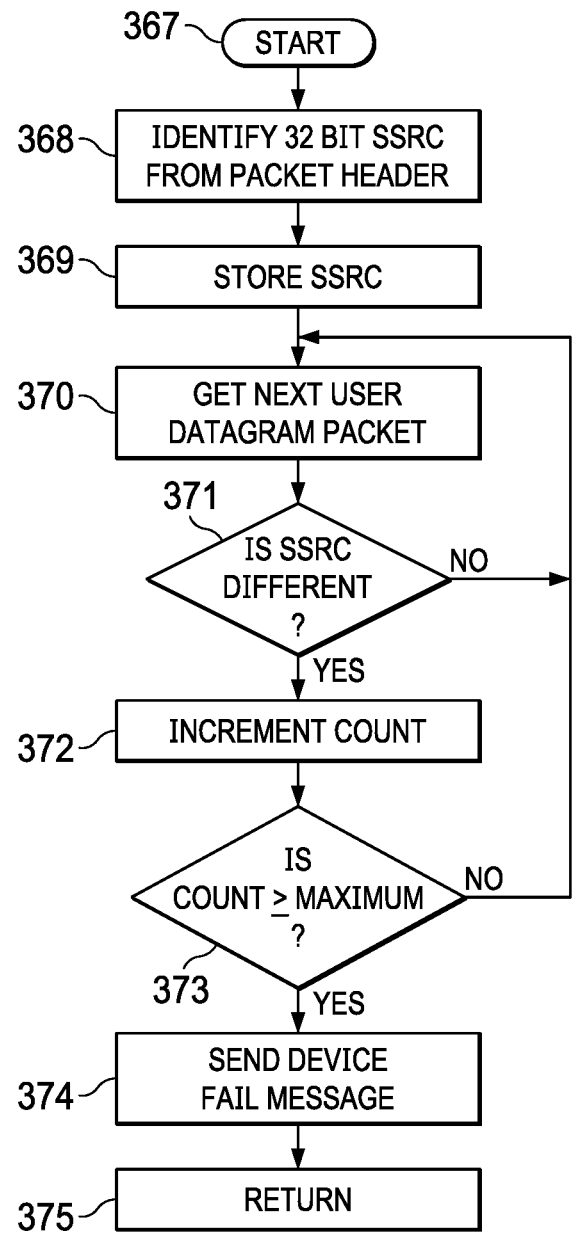

Referring to FIG. 2B, an embodiment of step 344, known as a method of excessive reconnect monitoring and recording will be described.

At step 367, the method begins. At step 368, the system fetches the first datagram packet from the mirrored streams of the current TDMA device set and identifies a first 32 bit SSRC from the packet header. The SSRC is a synchronization source identifier which uniquely identifies the source of the stream and so is used to identify the individual device in the TDMA device set and the current stream from that camera.

At step 369, the 32 bit numerical value of the SSRC is stored in memory. At step 370, the system fetches the next user datagram packet from the mirrored streams of the current TDMA device set.

At step 371, the SSRC is compared to the previous SSRC stored in the memory location. If the SSRC is the same, then the method returns to step 370. If the SSRC is different, then the method proceeds to step 372.

At step 372, a counter is incremented by one. At step 373, the count is compared to a predetermined maximum number. If the count is less than the predetermined maximum, then the method returns to step 370. If the count is greater than or equal to the predetermined maximum number, then the method moves to step 374. When the camera provides an excessive number of SSRC's, it is indicative that a single stream cannot be maintained and so camera failure is imminent. At step 374, a device "fail" message is generated and sent to the user device. At step 375, the method returns.

Figure 2C:
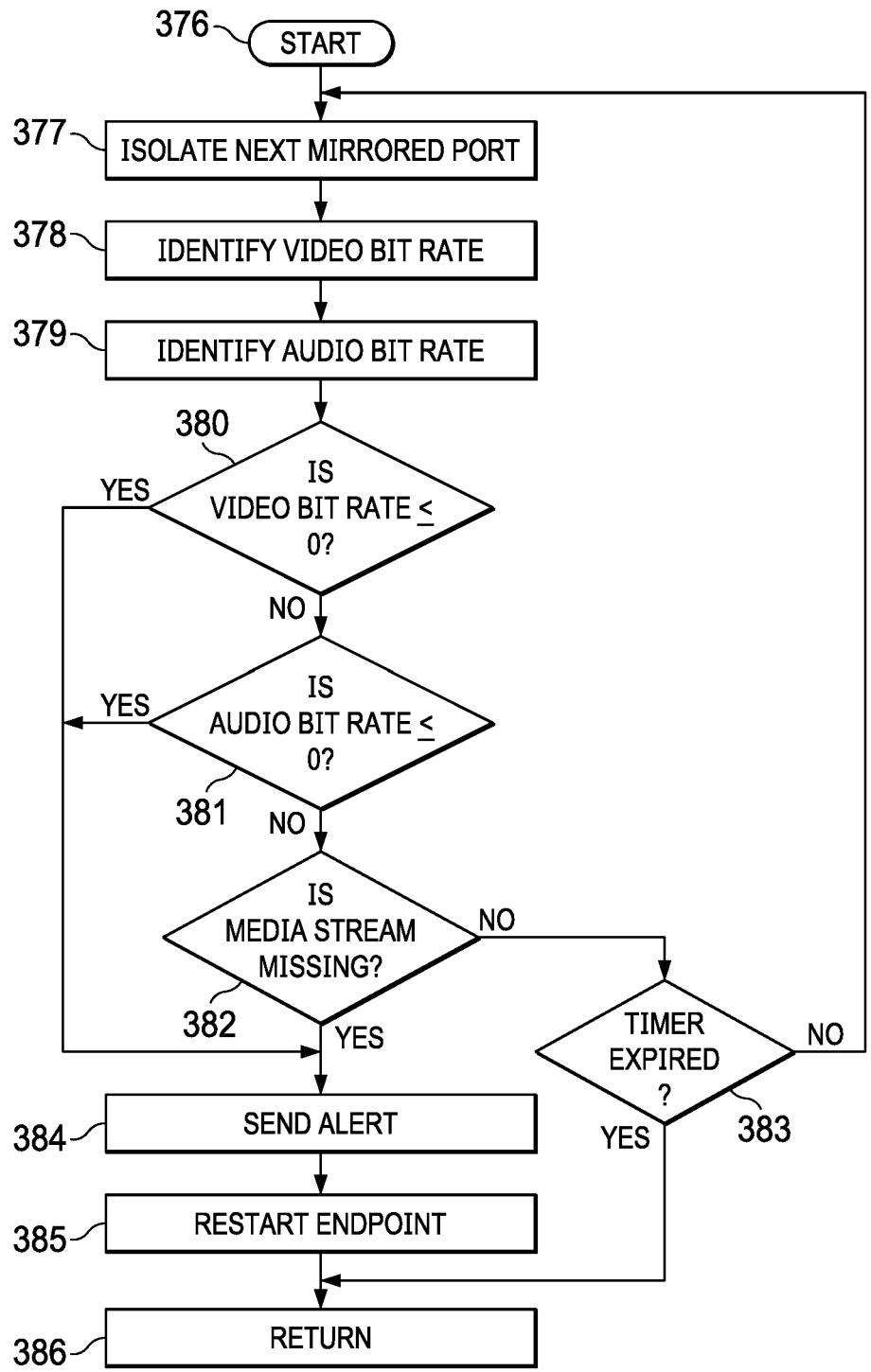

Referring to FIG. 2C, an alternate embodiment of step 344 known as a method of reboot upon video loss will be described.

At step 376, the method begins. At step 377, the system isolates the next mirrored port to be monitored. At step 378, the system identifies the video bit rate. At step 379, the system identifies the audio bit rate. At step 380, if the video bit rate is not less than or equal to zero, then the method moves to step 381. If it is, then the method moves to step 384, and sends an alert.

At step 381, if the audio bit rate is less than or equal to zero, then the method moves to step 384. If not, then the method moves to step 382.

At step 382, the system checks to see if an audio or video stream is missing. If not, then the method moves to step 383. If so, the method moves to step 384.

At step 383, the system checks to determine whether or not a predetermined time period has expired. If not, the method returns to step 377 and isolates the next mirrored port. If so, the method moves to step 386 and returns.

At step 384, a video or audio "fail" message is generated as is appropriate and sent to the user device.

At step 385, the method sends a message to restart the end point, and returns at step 386.

Figure 2D:
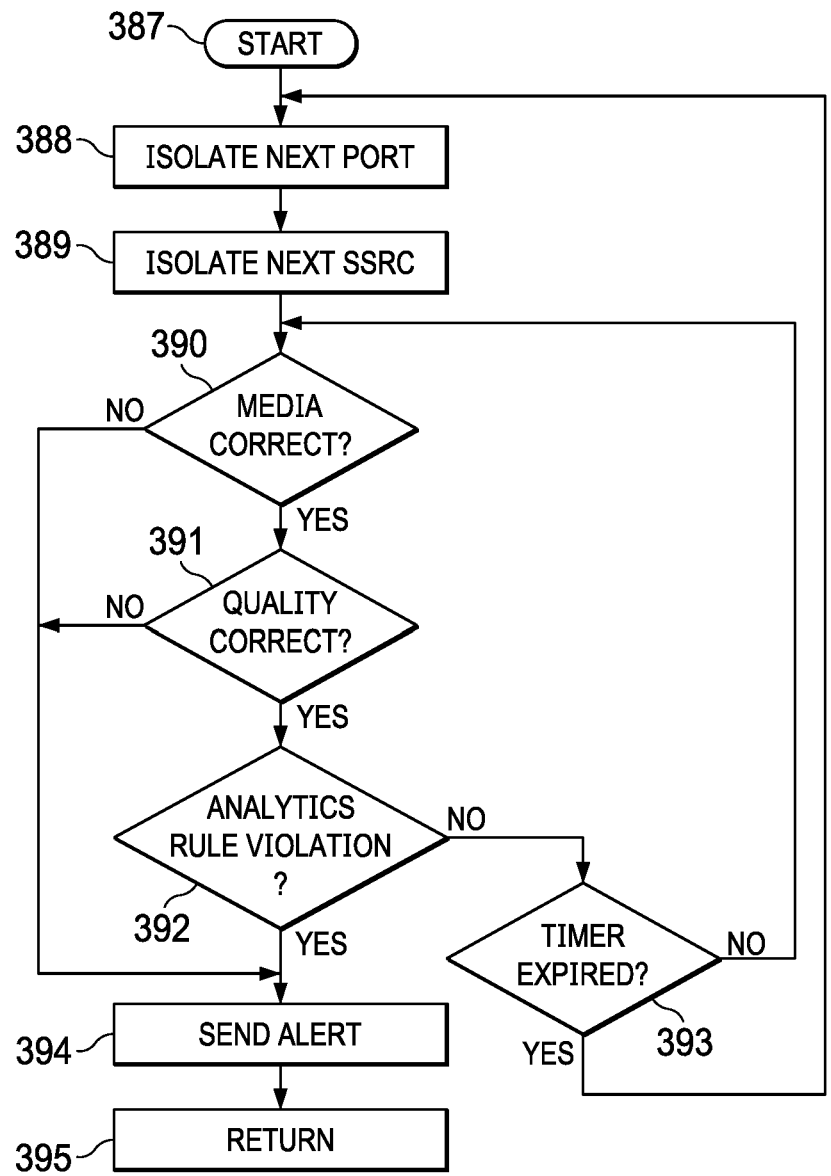

Referring to FIG. 2D, an alternate embodiment of step 344 known as a method of real time medium monitoring, analytics and alerting will be described.

At step 387, the method begins.

At step 388, the system isolates the next video port. At step 389, the system isolates the next SSRC. At step 390, the method determines whether or not the media is of the correct type. In a preferred embodiment, the "correctness" of the type of media is determined by comparing the format, and sequence of the datagrams to an established transport layer protocol, such as UDP, TCP, ethernet protocol, internet protocol such as IPV4 and IPV6. If a format mismatch is detected then the media is not the correct type. Format abnormalities include invalid parameters (as determined by set bit) or invalid codec slice format (as determined by header bytes) and invalid compression (as determined by a comparison against compression formats such as H.264, H.265, NPG4, MJPEG, JPEG, and PCMU). The correctness of the media also includes checking for invalid time delays, invalid bit rates, invalid transmission rates and invalid reconnect counts. In a further preferred embodiment, the correctness of the MAC address and whether or not a MAC address associated with a particular endpoint has or has not been bound to a switch port is also determined at this step. If the media is not of the correct type, then the method moves to step 394 and sends an alert to the user device. If the media is the correct type, the method moves to step 391.

At step 391, the system determines whether or not the "quality" of the media is sufficient. In a preferred embodiment, the quality of the media is determined as being above or below a specific metric such as bit rate or luminosity. Other quality metrics may be applied at this step. If not, the method moves to step 394 and sends an alert to the user device. If so, the method moves to step 392.

At step 392, the system conducts video analytics to determine whether or not a rule violation is present. Several types of rule violations are possible. For example, a rule violation may be generated by comparing previous video for a particular port and SSRC to the latest video to determine whether or not a physical object in the video frame has moved.

Other examples of rule violations and alert types are shown below in Table 1.

TABLE 1

| Alert Types | Description |
| --- | --- |
| Unit Offline | Notifies when a unit has not communicated with Razberi Monitor for 15 minutes. |
| Disk Health | Storage disk errors, disk missing, or disk failure notifications. |
| RAID Health | RAID array advice messages indicating issues or failure. |
| Malware Protection | Alerts when malware and related cyber threats has been detected, quarantined, or blocked. |
| Unauthorized Device | A device with a MAC address that does not match the bound MAC has been found. |
| Default Password | A default password has been used to secure a device. |
| Common Password | A common password has been used to secure a device. |
| Whitelist Violation | A device is attempting to access an unauthorized network. |
| CPU Temperature | The CPU temperature is too high. |
| Switch Traffic | The switch traffic rate is too high. |
| Switch Offline | Notifies when Razberi Monitor cannot communicate with a ServerSwitchIQ switch. |
| EndpointDefender Offline | Notifies when Razberi Monitor cannot communicate with an EndpointDefender. |
| License Expiration | Notifies when the Razberi Monitor license is expiring. |
| MAC Spoofing | A device with the correct MAC address but a mismatched POE state has been found. |
| Windows Event Log Alert | The Windows event log has an event of interest. |
| Unit Online | Notifies when a unit has returned online after going offline. |

If not, the method moves to step 393. If so, the method moves to step 394 and sends an alert. At step 393, the method determines whether or not a timer has expired. If not, the method returns to step 390. If so, the method returns to step 388.

At step 395, the method returns.

Figure 3A:
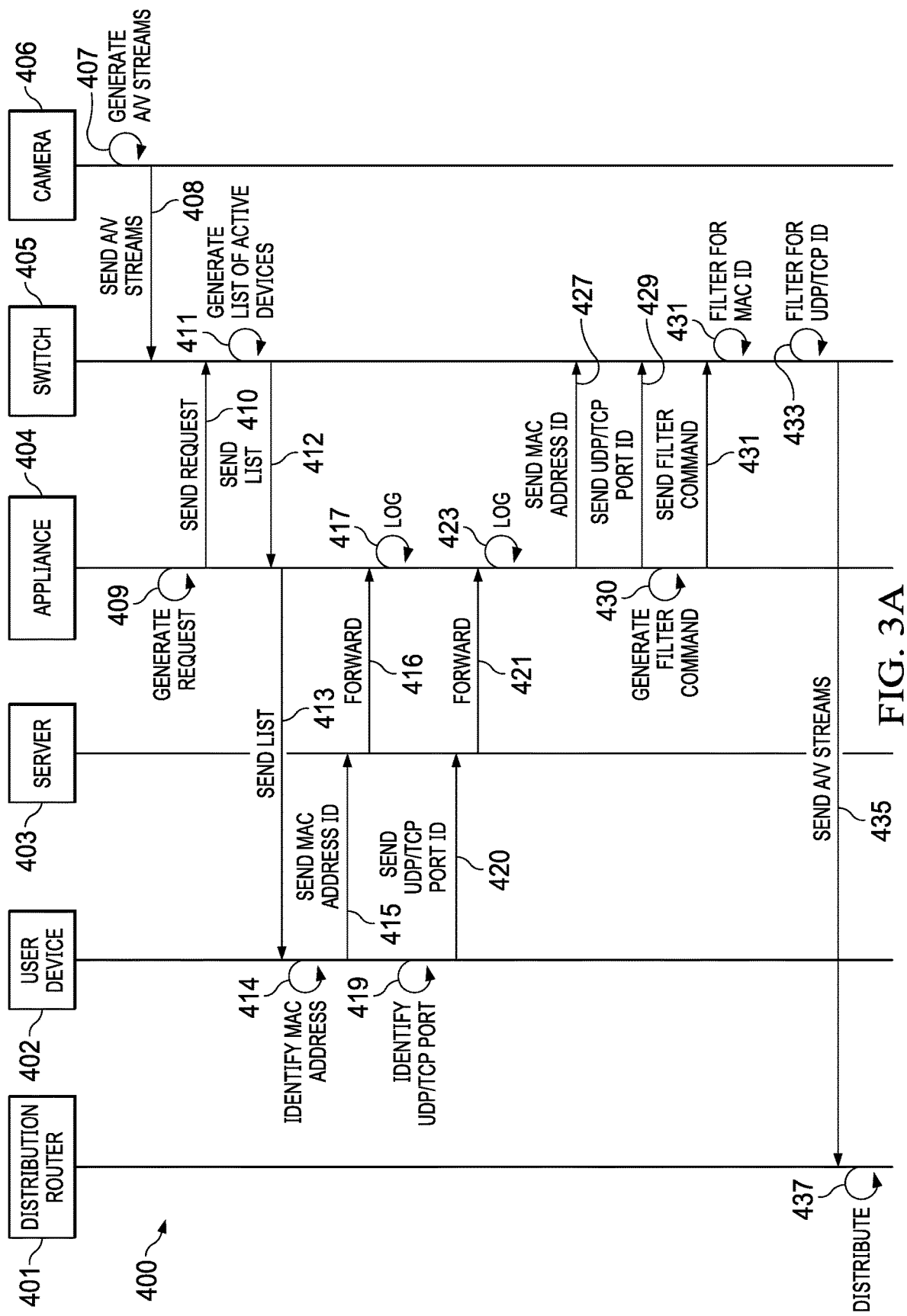
FIGS. 3A-3E are sequence diagrams for a preferred embodiment of methods for camera health/connection monitoring and alerting functionality.

Referring then to FIG. 3A, the steps required to carry out the device binding function of end point defense module 127 will be described.

At step 407, camera 406 generates audio video streams. At step 408, camera 406 sends the audio video streams to switch 405 in response to services running on server 404. It should be understood that camera 406 is exemplary, and that many devices can be connected to switch 405 and will respond in the same way as camera 406.

At step 409, appliance 404 generates a request for active devices. At step 410, appliance 404 sends the request for active devices to switch 405.

At step 411, switch 405 generates a list of active devices. At step 412, switch 405 sends a list of active devices to appliance 404. At step 413, appliance 404 forwards the list of active devices to user device 402.

At step 414 user device 402 identifies one or more MAC addresses from the list of active devices. In a preferred embodiment, the MAC address is an address from which traffic is allowed. In other embodiments, the MAC address ID may be an address from which traffic is prohibited. At step 415, user device 402 sends the MAC address ID to server 403. At step 416, server 403 forwards the MAC address ID to appliance 404. At step 417, appliance 404 logs the MAC address ID. At step 419, user device 402 identifies a UDP/TCP port from the list of active devices. In a preferred embodiment, traffic will be allowed only from the specific UDP or TCP ports identified. In another embodiment, traffic will be prohibited from the specific UDP or TCP ports identified.

At step 420, the UDP or TCP port ID is sent to server 403. At step 421, server 403 forwards the UDP or TCP port ID to appliance 404. At step 423, appliance 404 logs the UDP or TCP port ID.

At step 427, the MAC address ID is sent from appliance 404 to switch 405. At step 429, the UDP or TCP port ID is sent from appliance 404 to switch 405.

At step 430, the switch manager generates a command to the switch to filter for the chosen MAC address IDs and chosen UDP/TCP port IDs. At step 431, the filter command is sent to the switch.

At step 431, switch 405 executes the command and filters the AV streams for the particular MAC ID. At step 433, switch 405 filters the AV stream for the particular UDP or TCP port ID. At step 435, the filtered audio video streams are sent to distribution router 401. At step 437, distribution router 401 distributes the remaining AV streams as appropriate.

Figure 3B:
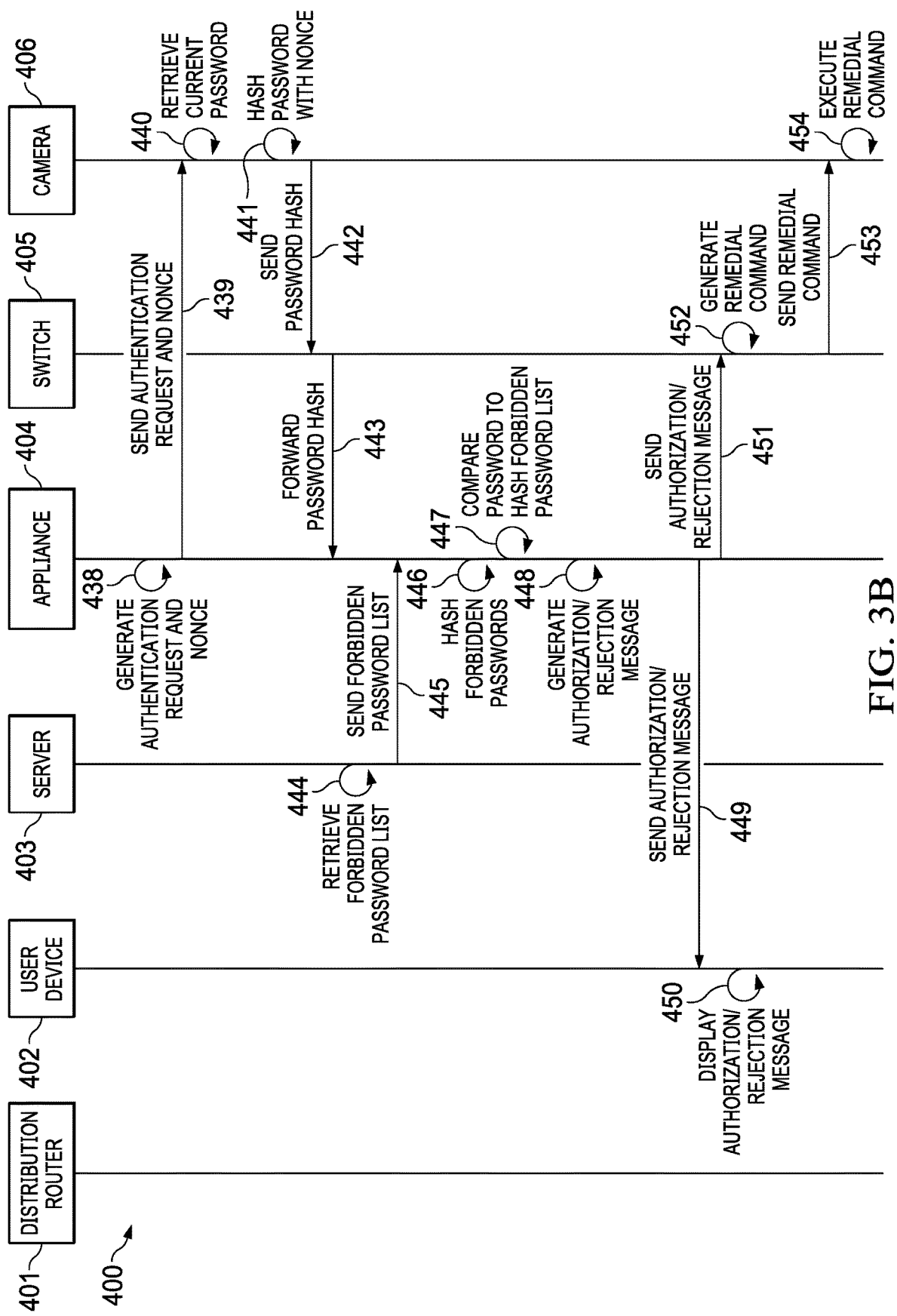

Referring to FIG. 3B, the steps required to carry out the password protection function of end point defense module 127 will be described.

At step 438, the appliance generates an RFC 2617 compliant basic or digest standard authentication request. At step 439, the authentication request is sent to camera 406 with a single use nonce value. At step 440, camera 406 retrieves the current password from memory. At step 441, the current password is hashed with the nonce. In a preferred authentication scheme, the hash is an MD5 hash. At step 442, camera 406 sends the hashed password to switch 405. At step 443, switch 405 forwards the hashed password to appliance 404. At step 444, server 403 retrieves a list of forbidden passwords from memory. In a preferred embodiment, server 403 retrieves the National Institute of Standards and Technology (NIST) list of blacklisted passwords from a third-party server (not shown). At step 445, the forbidden password list is sent to appliance 404 by server 403. At step 446, the appliance hashes each of the forbidden passwords with the nonce. At step 447, appliance 404 compares the hash of the current password to the hash of each of the forbidden passwords on the forbidden password list. The comparison is made between hash signature of the password and the hash signature of the known blacklisted or forbidden passwords. The hash signature of the known blacklisted or forbidden passwords is derived by applying the hash algorithms of the basic or digest authentication to each of the known blacklisted or forbidden passwords. If the hashed password matches any of the hashed blacklisted or forbidden passwords, then the current password is rejected. In this way, the actual password in the camera is not transmitted on a network line, nor is it compared in unencrypted form, but can still be recognized and flagged as an unsecure password, thereby increasing the password protection security.

At step 448, as a result of the comparison appliance 404 generates either an authorization or a rejection message. For example, the authorization message can comprise an acknowledgment of the current password. As another example, the rejection message may include a remedial command, such as a POE disconnect for the device. As another example, the rejection message can include a password reset command, resetting the password to NIST and rule compliant password.

At step 449, the authorization or rejection message is sent to user device 402. At step 450, user device 402 displays the message and can take remedial action.

At step 451, the authorization or rejection message is sent from appliance 404 to switch 405. At step 452, switch 405 generates a remedial command. At step 453, the remedial command is sent from switch 405 to camera 406. At step 454, camera 406 executes the remedial command.

Figure 3C:
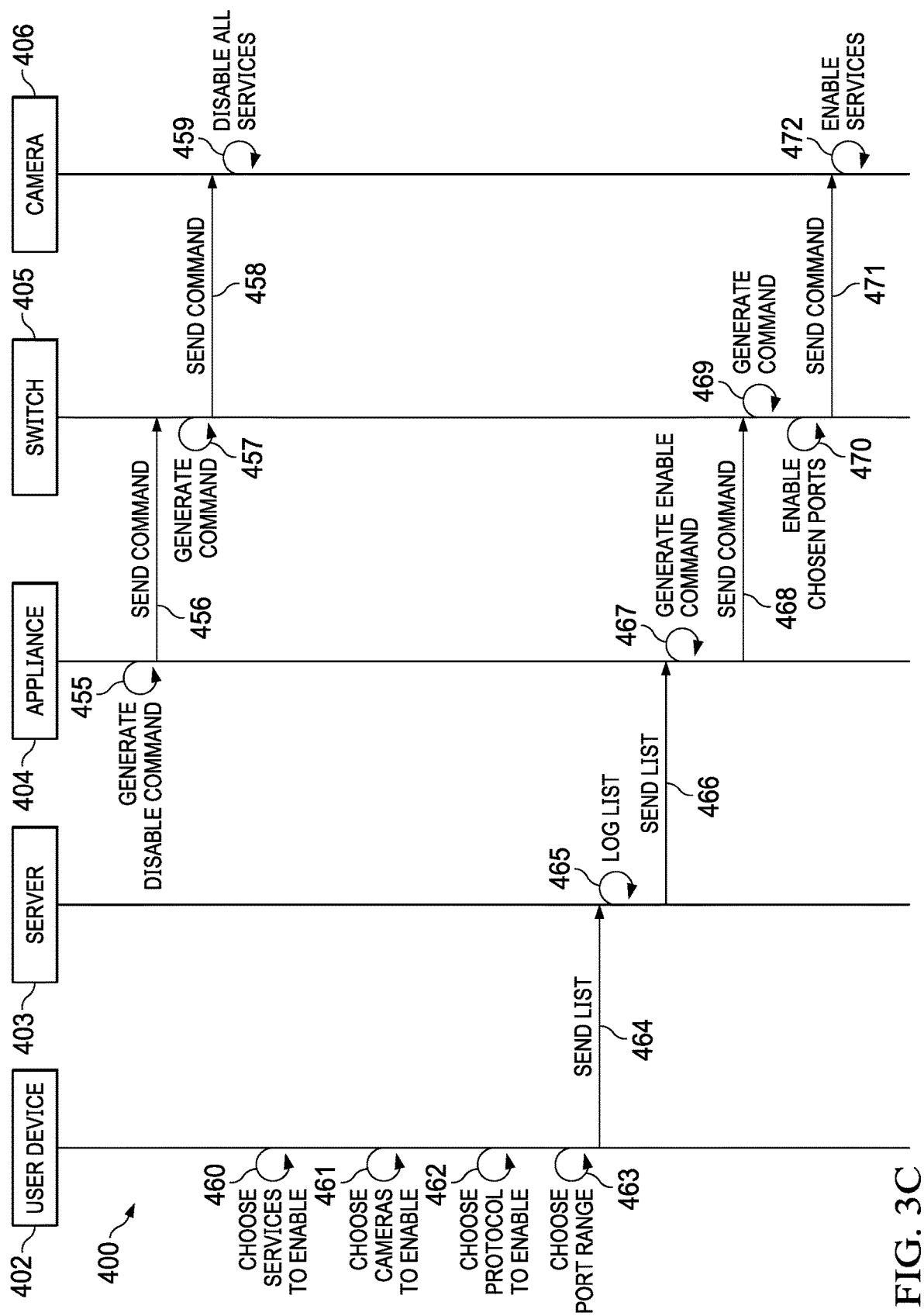

Referring to FIG. 3C, the steps required to carry out the firewall function of endpoint defense module 127 will be described.

At step 455, the initial device set up takes place and appliance 404 generates a disable command for all services at all cameras. At step 456, the command is sent to switch 405. At step 457, switch 405 generates a disable all services command for each camera registered. At step 458, switch 405 sends the disable command to all cameras. At step 459, camera 406 receives the disable all services command and disables all services.

At step 460, user device 402 chooses a set of services to enable. In one embodiment, services such as HTTP, HTTPS and RTSP are among the services which may be enabled or disabled for use by the cameras.

At step 461, user device 402 chooses a set of devices in which the services will be enabled.

At step 462, user device 402 chooses a protocol to enable. In a preferred embodiment, the specified protocol is one of either TCP or UDP.

At step 463, user device 402 chooses a corresponding port or port main for which the chosen protocols will be enabled.

At step 464, user device 402 sends a list of chosen services, chosen devices, chosen protocols and chosen port ranges to server 403. At step 465, server 403 logs the chosen services, chosen cameras, chosen protocols and chosen port ranges.

At steep 466, server 403 forwards the list to appliance 404. At step 467, appliance 404 generates an enable command for each chosen device. The enable command includes the chosen services, chosen protocol and the chosen port range. At step 468, each of the commands is sent from appliance 404 to switch 405. At step 469, switch 405 generates a camera specific command for each of the chosen cameras for which services to enable and which protocols to enable. At step 470, switch 405 enables the chosen ports. At step 471, a command is sent to each of the chosen cameras, including services to enable and the protocol to enable. At step 472, camera 406 enables only the services included in the command.

Figure 3D:
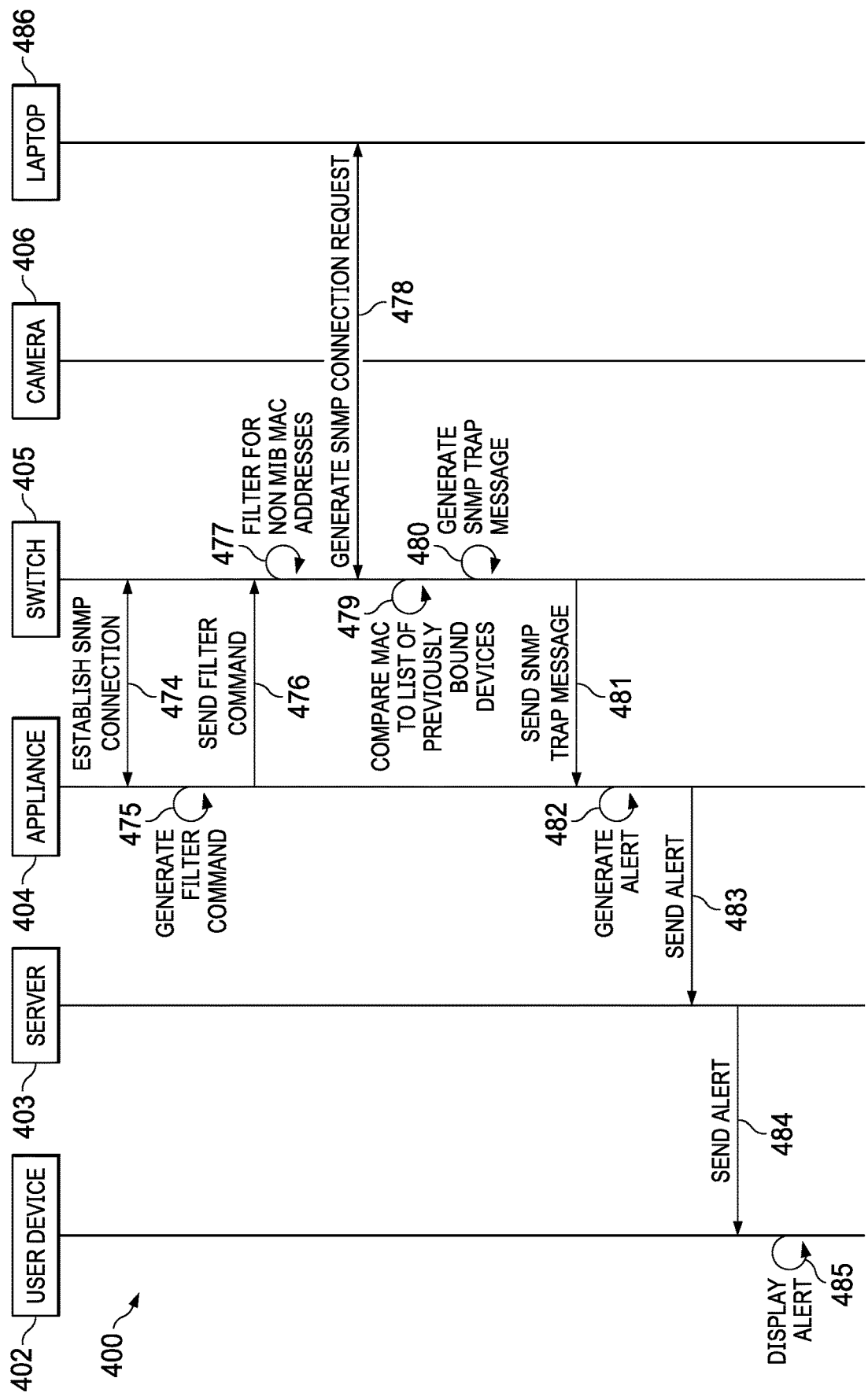

Referring to FIG. 3D, the steps required to carry out the MAC spoofing function of endpoint defense module 127 will be described.

At step 474, appliance 404 establishes an SNMP communication channel with switch 405. At step 475, appliance 404 generates a filter command to request a report of all MAC addresses which are not contained in the management information base resident on switch 405.

At step 476, the filter command is sent from appliance 404 to switch 405. At step 477, switch 405 filters all incoming packets in the current group for MAC addresses that are not in management information base. At step 478, third-party laptop 486 attempts to establish an SNMP communication channel with switch 405.

At step 479, switch 405 compares the MAC address of third-party laptop 486 to the MAC addresses resident in the memory of the appliance. This list was created during the device binding activity defined in the steps in FIG. 3A. If this MAC is different than what was authorized, then at step 480, switch 405 generates an SNMP tram message containing third-party laptop 486 MAC address.

At step 481, the SNMP trap message is sent from switch 405 to appliance 404. At step 482, appliance 404 generates an appropriate alert including the port number of camera 406, the MAC address of camera 406 and the MAC address of third-party laptop 463. At step 483, the alert is sent from appliance 404 to server 403. At step 484, server 403 forwards the alert to user device 402, where remedial commands can be generated, such as disabling the port or ports affected.

Figure 3E:
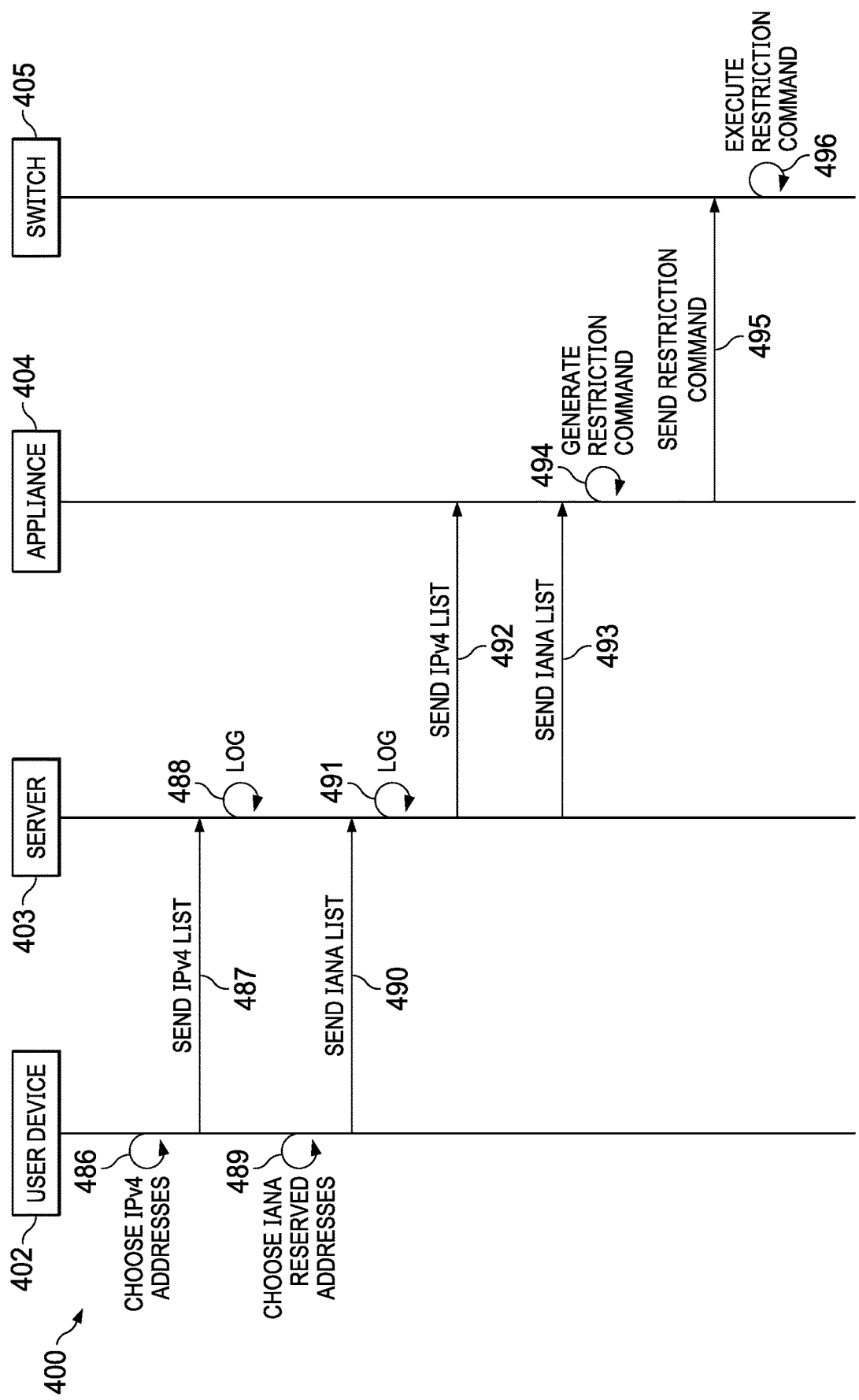

Referring then to FIG. 3E, the service required to carry out the internet protection function of end point defense module 127 will be described.

At step 486, user device 402 chooses a set of IPV4 addresses which are non-routable, as defined by IETF RFC 1918. At step 487, the IPV4 list is sent from user device 402 to server 403. At step 488, server 403 logs the IPV4 non-routable list. At step 489, user device 402 chooses an IANA reserved address list for link local and other special purposes. Examples of non-routable IPV4 address are as follows:

10.0.0.0/8 (16777214 addresses)
172.16.0.0/12 (1048574 addresses)
192.168.0.0/16 (65534 addresses)
10.0.0.0/8 (16777214 addresses)
172.16.0.0/12 (1048574 addresses)
192.168.0.0/16 (65534 addresses)

An example of an IANA reserved address is:
169.254.0.1/16 (link local addresses)

At step 490, the IANA list is sent from user device 402 to server 403. At step 491, server 403 logs the IANA list.

At step 492, server 403 forwards the IPV4 address list to appliance 404. At step 493, server 403 sends the IANA reserved address list to appliance 404.

At step 494, appliance 404 generates a restriction command. In a preferred embodiment, the restriction command is a command line function which deactivates all IPV4 addresses which are routable except for those chosen. The restriction command in a preferred embodiment also includes disabling all address which are not link local addresses.

At step 495, appliance 404 sends the restriction command to switch 405. At step 496, switch 405 executes the restriction command. By executing the command, traffic is restricted to chosen non-routable addresses so that end point devices can be prevented from receiving or sending information to public routable IP addresses where non-authorized entities reside.

Figure 4:
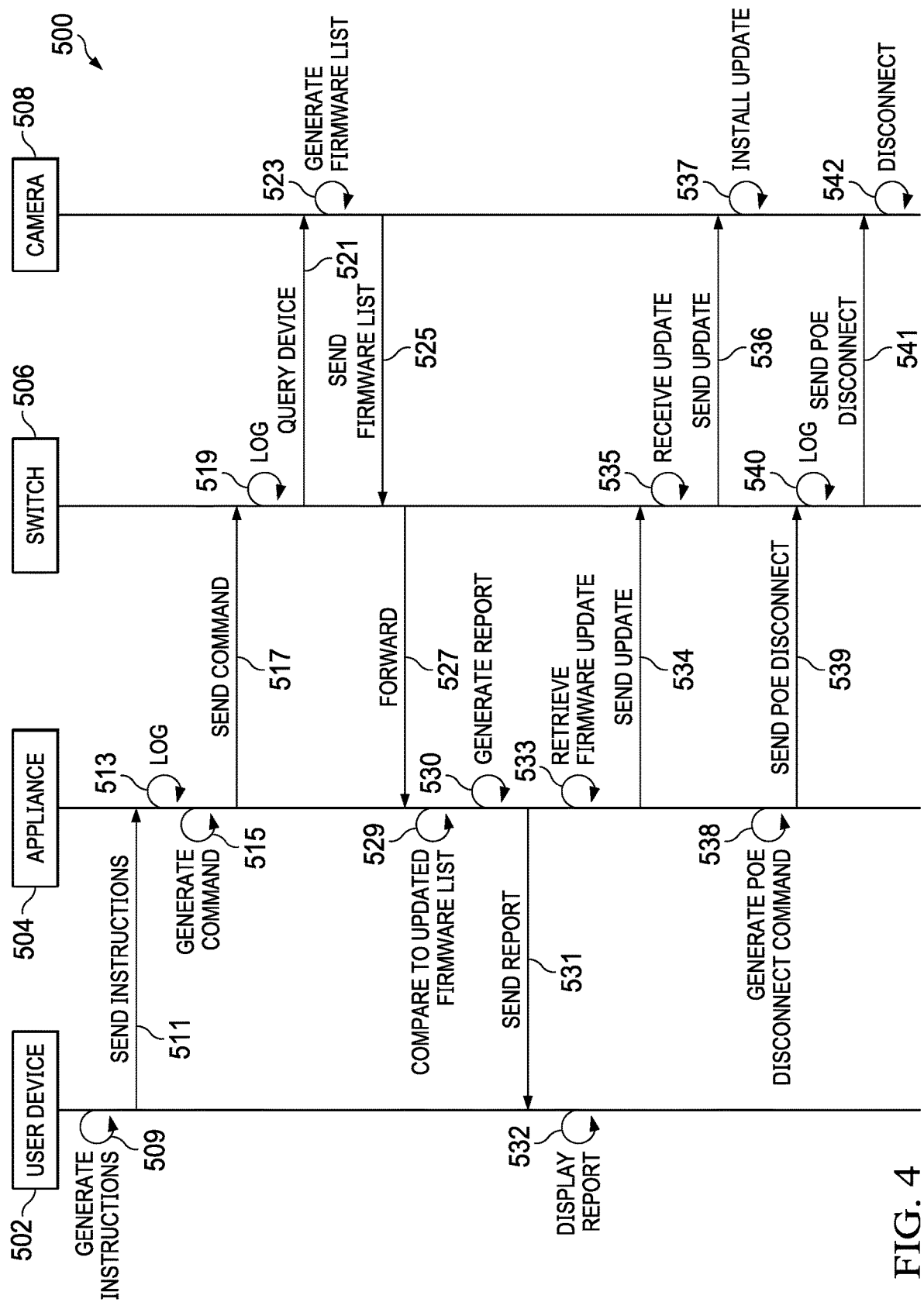
FIG. 4 is a sequence chart for endpoint device management functionality.

Referring then to FIG. 4, method 500 of end point device management of other device health module 125 will be described.

At step 509, user device 502 generates instructions for quarrying the camera for firmware and security patch updates. At step 511, the instructions are sent from user device 502 to appliance 504. At step 513, appliance 504 logs the instructions. At step 515, appliance 504 generates the appropriate command for the management interface of switch 506. At step 517, the quarry command is sent from appliance 504 to switch 506. At step 519, switch 506 logs the quarry command. At step 521, switch 506 quarries camera 508. At step 523, camera 508 generates a list of currently operating firmware and the most recent version of the security patch updates present. At step 525, camera 508 sends the firmware version and security patch version to switch 506. Switch 506 then forwards the firmware version and security patch update version to appliance 504, at step 527. At step 529, appliance 504 compares the firmware version and the security patch version to the most current versions available. At step 530, appliance 504 generates a report which indicates whether or not the firmware is up to date and whether or not the security patch versions represent the most recent versions available.

At step 531, the report is sent to user device 502. At step 532, the report is displayed. The user can then choose to update the firmware and security patches as required or disable the camera if it is a security threat.

As one possible remedial measure, appliance 504, at step 523 retrieves the appropriate firmware update from memory. At step 534, the update is sent from appliance 504 to switch 506. At step 535, the switch receives the update. At step 536, switch 506 sends the update to camera 508. At step 537 the update is installed.

As another possible remedial measure, at step 538, appliance 504 generates a power over ethernet disconnect command. At step 539, the disconnect command is sent from appliance 504 to switch 506. At step 540, switch 506 logs the disconnect command. At step 541, switch 506 sends the disconnect command to camera 508. At step 542, camera 508 is disconnected and turned off.

Figure 5:
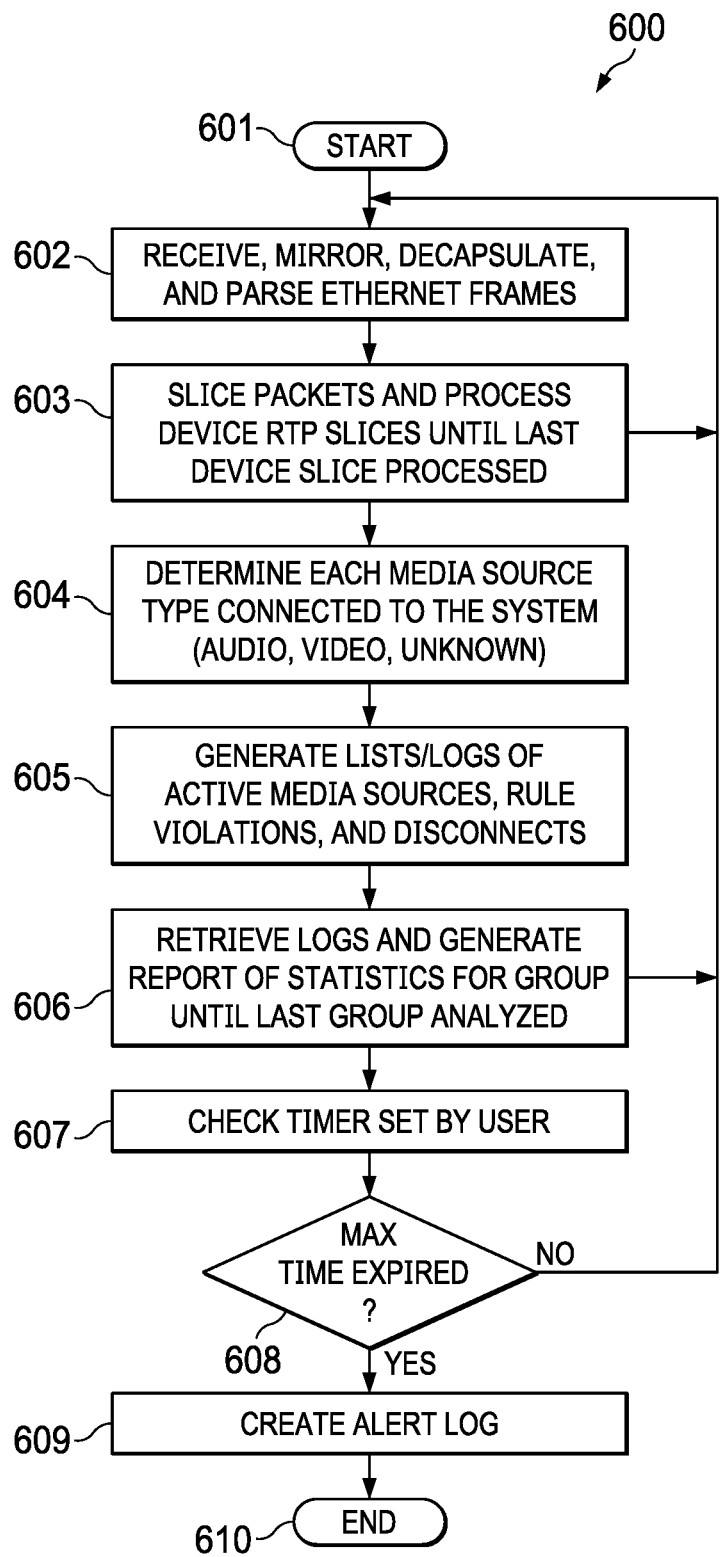
FIG. 5 is a flow chart for analyzing datagrams according to an alternate embodiment.

Referring to FIG. 5, an alternate method 600 for analyzing datagrams and detecting transport layer abnormalities and security device malfunctions will be further described.

At step 601, the processor starts an Ethernet pre-processing module including a "media watcher" function of other device health module 125.

At step 602, the Ethernet pre-processing module uses a user input and a detected device count to vary the amount of temporary memory required for each mirroring and processing cycle to reduce the burden placed on the processor of the switch.

The Ethernet frames are received based on the port increments or group increments. For example, if there are 24 media sources, then memory may be dynamically allocated to receive six (6) header lengths per cycle. Step 602 further includes decapsulating and parsing the Ethernet frames. The parsing generates one or more datagrams, such as a UDP datagram or a TCP segment.

At step 603, packets are delivered to a slicer which divides the packets into their smallest possible units. RTP slices or minimum coded units (MCUs) are then processed in order to analyze the slices or MCUs for source activity information and valid format indicators. The packets are sliced for each frame of a device in the TDMA device set group until all frames for the device have been processed. Then, the device is incremented and step 602 repeated for another device of the TDMA device set until all frames from all devices of the group have been processed.

At step 604, media source types are determined for each device connected to the system using the smallest units obtained at step 603. For example, slices may be obtained at step 603 for MPEG-1 or MPEG-2 formats, while MCUs are obtained for the MJPEG format. Other possible units obtained at step 603 will be recognized by those skilled in the art. This step includes parsing header information from a mirrored Ethernet frame, converting the header bits from the network byte order to the host byte order, and scanning the header bits for identifying information. The determination of the UDP datagram type is made, for example, using header size.

Referring to step 605, lists and logs of active media sources and their rule violations are generated. Other lists and logs generated at step 605 include lists of inactive/idle media sources and media sources that have been shut down or disconnected from power.

At step 606, a determination is made as to whether or not every group of devices connected to the network video recorder has been monitored. If not, the group index is incremented, and the method returns to step 602 to process data from the next group.

When every device of every group has been monitored, then at step 608, a determination is made as to whether or not the timer function set by the user for the monitor module has expired. If it has not, then the group is incremented back to the first group and the method returns to step 602, updating the logged transport layer events as necessary. If the timer has expired, then the method moves to step 609.

At step 609, an alert log is generated based on the rule violations log. Power disconnect instructions are generated based on the power disconnect log.

At step 610, the process concludes with the processor setting indicators for each of the logs that have been generated so that appropriate action takes place as a result of the logs, such as disconnecting power from certain client devices, updating a display that indicates active, inactive, and new/unknown sources, and sending rule violation alerts.

Figure 6:
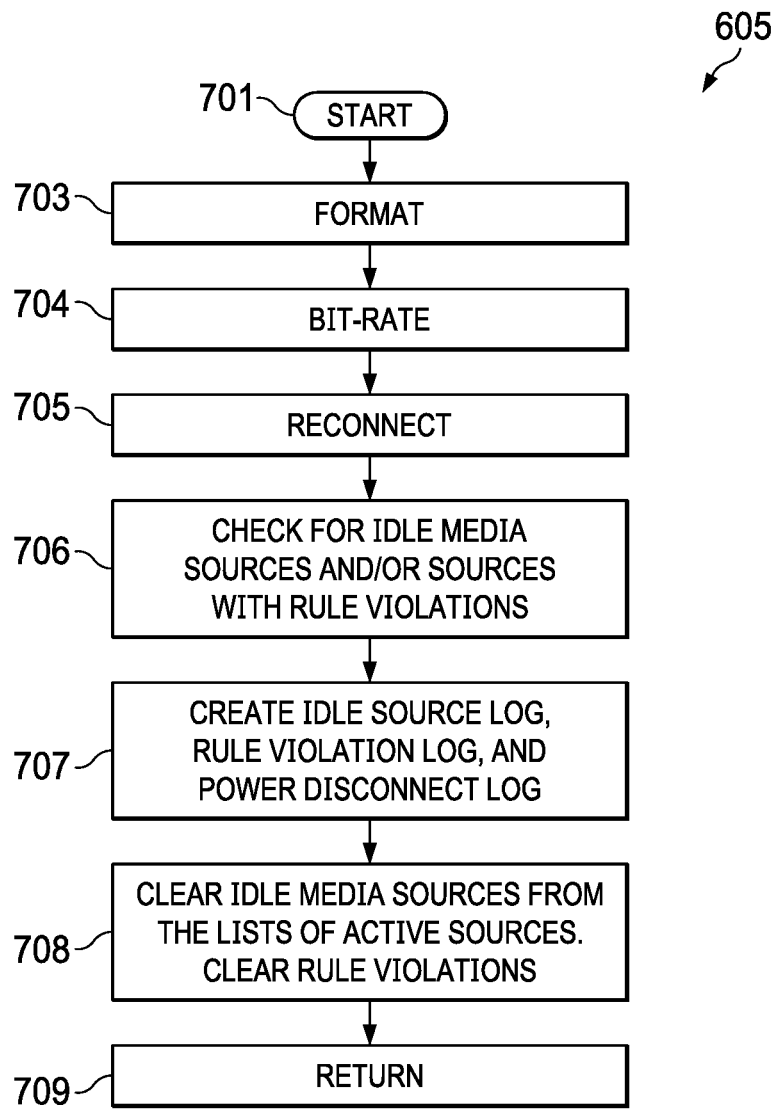
FIG. 6 is a flow chart of a method of logging active media sources, rule violations and disconnects according to an alternate embodiment.

Referring to FIG. 6, a preferred embodiment of step 605 is depicted.

At step 701, the format analysis module starts.

At step 703, the format of the header bytes/bits are analyzed for each device of a group according to codec compression format standards. Step 703, includes a determination that the header bytes/bits indicate a valid first video compression format, such as H.264. For example, the forbidden zero bit may be checked at this step, where a value of 1 indicates a syntax violation. By way of another example, the slice header semantics may be checked at this step, such as the value of the slice header syntax elements. In a preferred embodiment, at least the Instantaneous Decoding Refresh (IDR) bit is checked. At this step, a format indicator is recorded.

Step 703 further includes a determination that the metadata indicates a valid second video compression format, such as H.265. For example, if the first video compression format is not present after initial analysis, then the metadata may indicate a second video compression format.

Step 703 includes a comparison of an expected slice/MCU format with a current or real-time slice/MCU format. When the comparison results a format difference, then a format rule violation is recorded.

Step 703, further includes a determination that the header metadata indicates a valid audio compression format, such as PCMU. Other audio compression formats may be checked for validity in this process, such as MP3 and FLAC. At this step, an audio format rule violation is recorded.

At step 704, a bitrate analysis module starts. The bitrate analysis module analyzes the metadata and statistics from steps 603 and 604, such as start and end times, to make operational rule violation determinations. The operational rule violation determinations include determining and tracking a bit rate for the IP camera. In a preferred embodiment, the determination of a rule violation is made by comparing the bit rate to a predetermined value, such as a percentage of the linespeed for the network.

At step 705, a reconnect analysis module starts. The reconnect analysis module analyzes the metadata and statistics from steps 603 and 604, such as start and end times, to make a rule violation determination for reconnects. This step includes the Camera Health and Monitoring API obtaining from memory one or more monitoring rule video threshold times and video reconnect count thresholds from memory. For example, a first threshold time may be five minutes, and a first reconnect count threshold may be no more than two reconnects in the five minutes. In this step, excessive marker bits within an interval of time may indicate excessive reconnects. By way of another example, if there have been more than four media streams from new sources on a port in the last 5 minutes, or a threshold period of time, then an "excessiveReconnect" rule has been violated.

In a preferred embodiment, rule violations are recorded in temporary storage or cache memory.

Figure 7B:
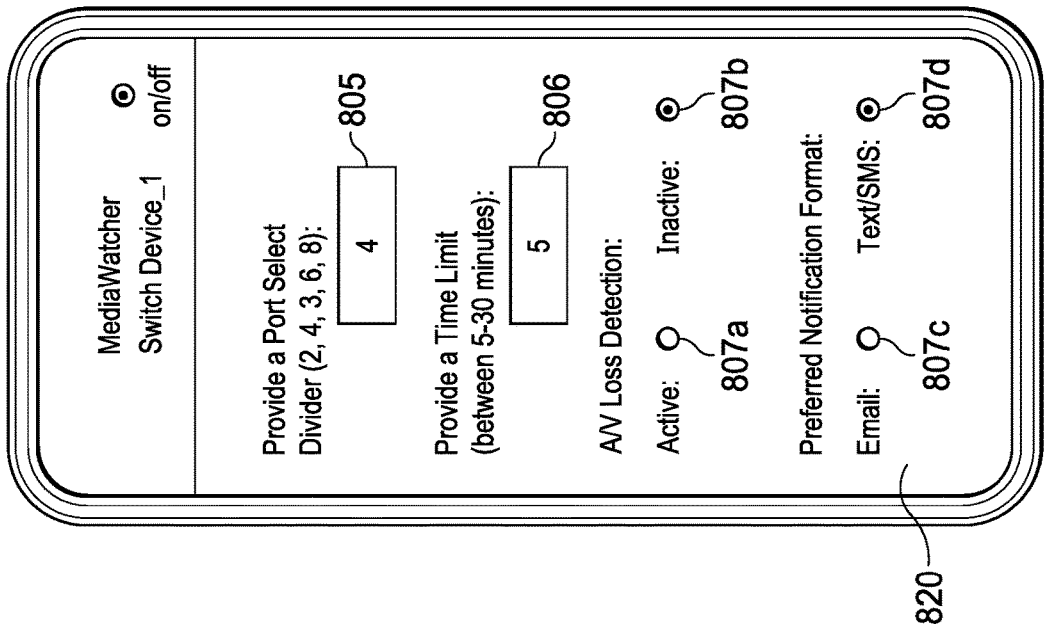
FIGS. 7A-7D are GUI screens of a preferred embodiment.
Figure 7A:
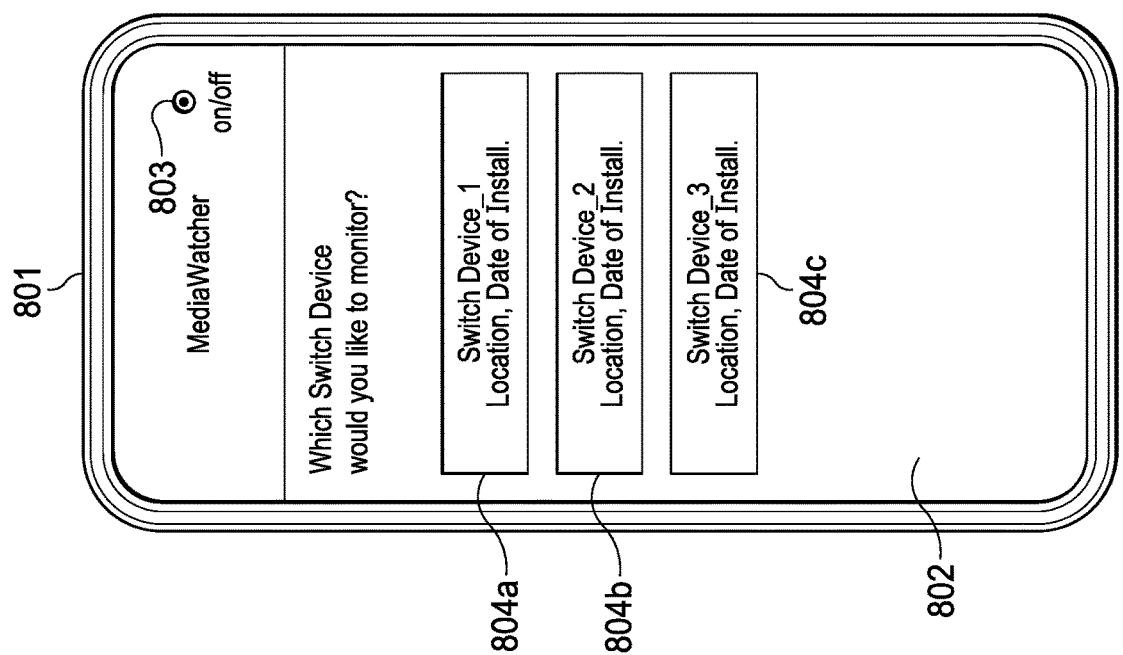
Figure 7D:
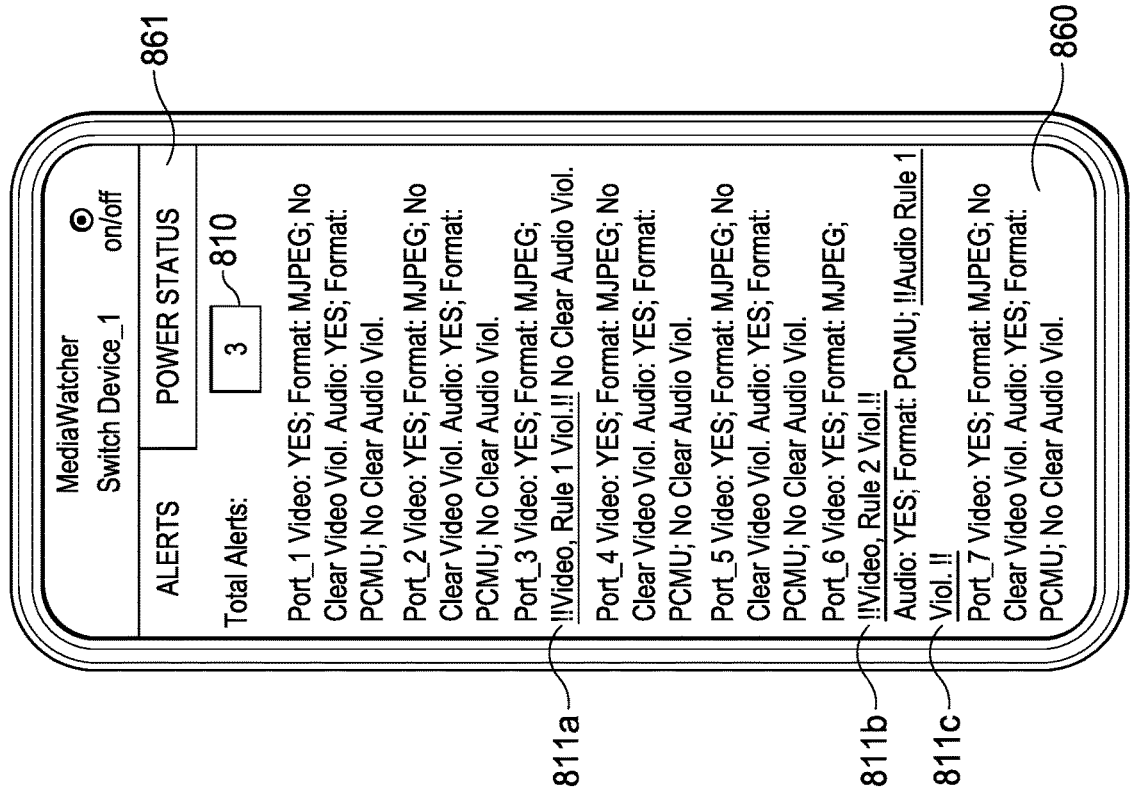
Figure 7C:
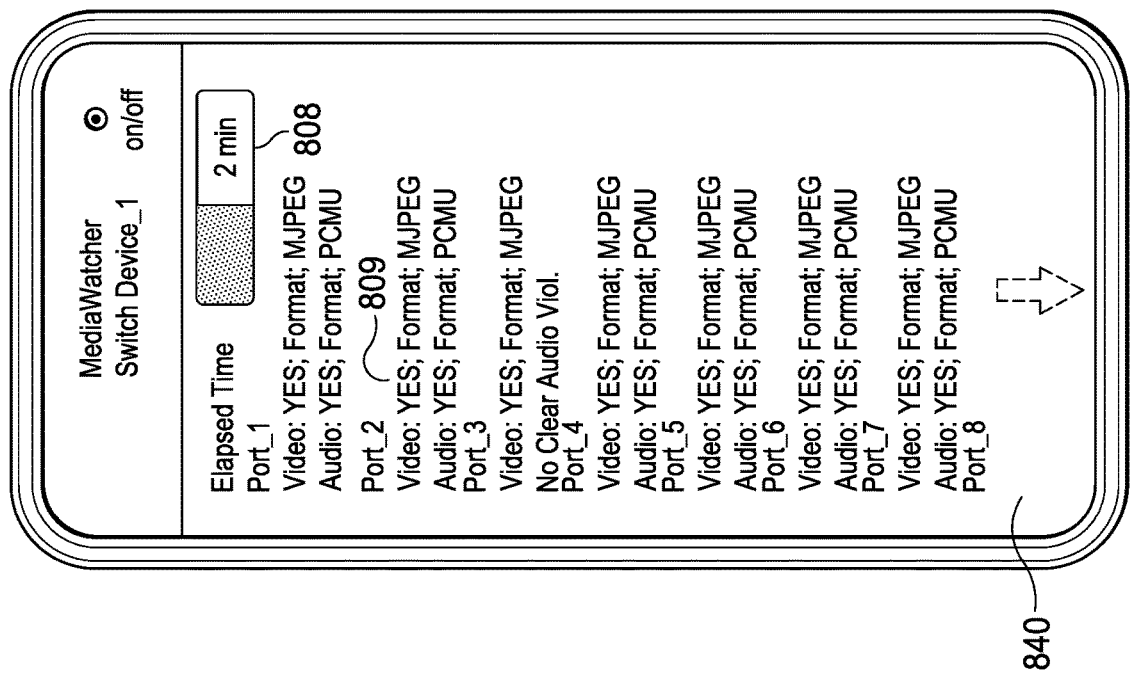

At step 706, the lists of media sources and associated rule violations generated in steps 703-705 are checked for idle media sources. The status of each of the media sources are updated. In a preferred embodiment, the check performed at this step includes updating a display. For example, the updating of the status of a media source may occur, as shown in FIG. 7C.

At step 706, the switch outputs a list of active audio sources, video sources, and new/unknown sources. When the sequence cycle is later than the first sequence cycle, the network video recorder both updates and outputs the list of sources.

At step 707, an idle source log, a rule violation log, and a power disconnect log are created based on the list. In a preferred embodiment, this means that the records of rule violations, idle sources, and power disconnects are transferred from temporary or cache memory to long-term storage or the main memory of the switch.

At step 708, the temporary or cache memory is cleared, clearing the records of idle media sources, rule violations, and power disconnects from the temporary or cache memory, so that the process may be repeated.

Referring now to FIGS. 7A, 7B, 7C, and 7D various interactive screens will be described. User device 302 may include a mobile device, such as smart phone 801. Smart phone 801 includes a user interface 802, such as a touch screen.

In a preferred embodiment, screen 802 includes GUI elements, such as toggle 803 and buttons 804a, 804b, and 804c which receive video data and are used to transmit commands to the appliance. In this screen a choice is provided as to which device should be monitored by the appliance. Toggle 803 controls activation of the GUI. Buttons 804a, 804b, and 804c allow choices of which devices the user wishes to monitor.

Screen 820 includes input elements 805 and 806. Element 805 allows a choice of port select dividers. Port select dividers provide a means to choose which TDMA device sets will be monitored. Element 806 provides a time limit for monitoring each successive TDMA camera group. Screen 820 further includes one or more notification toggle buttons, such as A/V loss detection active toggle button 807a, A/V loss detection inactive toggle button 807b, email toggle button 807c and text/SMS toggle button 807d. These buttons enable or disable reporting functions of the Appliance at noted.

Screen 840 includes a notification element 808 and one or more status indicators 809. In a preferred embodiment, the status indicators are displayed in a scrollable display, and include video type and status, audio type and status, and detected compression format status. In an alternative embodiment, the detected protocol status may also be displayed.

Screen 860 further includes a notification element 810 and one or more interactive alert/notification elements 811a, 811b, and 811c. In a preferred embodiment, notification element 810 provides a numerical total of the number of alerts received.

Element 811a provides video source identifying information and a time associated with the last video packet received is provided. Element 811b provides video source identifying information and either a bit rate or a time between the first video packet and the last video packet received is provided. Element 811c provides audio source identifying information and a time associated with the last audio packet received is provided. Elements 811b and 811c provide the time associated with each rule violation.

Although one or more enabling embodiments of the present disclosure have been described in detail, those skilled in the art should understand that various changes, substitutions and alterations may be made without departing from the spirit and scope of the present disclosure. For example, the choice of electronic components can be made in a variety of different ways and from a variety of manufacturers to accomplish the functionality. The dimensions of the housing may be changed and the number of Ethernet ports may be scaled as further examples. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. An appliance for monitoring a set of endpoint devices, operatively connected to a switch, the appliance comprising:
   a processor;
   a memory connected to the processor;
   the memory containing instructions that, when executed by the processor cause the appliance to carry out the steps of:
      detecting a count of endpoint devices in the set of endpoint devices;
      dynamically allocating, based on the count of endpoint devices, temporary memory for each mirroring and processing cycle to reduce switch processing burden; wherein each mirroring and processing cycle comprises:
         receiving a set of mirrored data streams from the switch;
         dividing the set of mirrored data streams into a set of groups; and
         analyzing, in a time division multiple access (TDMA) format, each group of the set of groups individually for a predetermined condition; and,
      generating an error message upon detection of the predetermined condition.

2. The appliance of claim 1 wherein the memory contains further instructions, that when executed by the processor cause the appliance to carry out the steps of:
   generating a remedial command based on the predetermined condition; and, sending the remedial command to the switch.

3. The appliance of claim 1 wherein the step of analyzing further comprises:
   identifying a first SSRC from a first datagram packet;
   identifying a second SSRC from a second datagram packet;
   comparing the first SSRC to the second SSRC;
   incrementing a counter based on the comparison; and,
   reporting an error if the counter exceeds a predetermined number.

4. The appliance of claim 1 wherein the step of analyzing further comprises:
   identifying a video bit rate from the set of mirrored data streams;
   determining whether or not the video bit rate is less than or equal to zero; and,
   reporting an error if the video bit rate is less than or equal to zero.

5. The appliance of claim 1 wherein the step of analyzing further comprises:
   identifying an audio bit rate from the set of mirrored data streams;
   determining whether or not the audio bit rate is less than or equal to zero; and,
   reporting an error if the audio bit rate is less than or equal to zero.

6. The appliance of claim 1 wherein the step of analyzing further comprises:
   isolating a first data stream from the set of data streams using an SSRC;
   analyzing the first data stream for a media parameter;
   analyzing the first data stream for a quality parameter;
   analyzing the first data stream for a rule violation; and,
   sending an alert based on one of the group of the media parameter, the quality parameter and the rule violation.

7. The appliance of claim 1 wherein the appliance is further operatively connected to a user device, wherein the memory further contains instructions that, when executed by the processor cause the appliance to carry out the steps of:
   receiving a list of chosen MAC address IDs from the user device;
   receiving a list of chosen UDP/TCP ports from the user device;
   generating a filter instruction based on the list of chosen MAC address IDs and the list of the chosen UDP/TCP ports;
   sending the filter instruction to the switch;
   whereby the mirrored data streams in a group of the set of groups are filtered.

8. The appliance of claim 7 wherein the memory further contains instructions that, when executed by the processor cause the appliance to carry out the steps of:
   receiving a list of services to enable;
   receiving a list of devices to enable;
   receiving a list of protocols to enable;
   receiving a port range to enable;

generating an enable command including the services to enable, the devices to enable, the protocols to enable and the port range;
sending the enable command to the switch; and,
whereby a set of services identified in the list of services to enable, a set of devices identified in the list of devices to enable, a set of protocols identified in the list of protocols to enable and a set of ports in the port range to enable are activated.

9. The appliance of claim 7 wherein the memory further contains instructions that, when executed by the processor cause the appliance to carry out the steps of:
receiving an IPV4 address list from the user device;
receiving an IANA restricted address list from the user device;
generating a restriction command based on the IPV4 address list and the IANA restricted address list; and,
sending the restriction command to the switch, whereby an IPV4 address and an IANA restricted address are activated for use.

10. The appliance of claim 1 wherein the memory further contains instructions that when executed by the processor cause the appliance to carry out the steps of:
receiving a first encrypted hash signature of a current device password;
deriving a second encrypted hash signature of a forbidden password;
comparing the first encrypted hash signature to the second encrypted hash signature;
generating a command message based on the comparison; and,
sending the command message to the switch.

11. The appliance of claim 1 wherein the memory further contains instructions that when executed by the processor cause the appliance to carry out the steps of:
establishing an SNMP connection with the switch;
generating a command to filter a MAC address by a management information base;
sending the command to the switch;
whereby the switch compares an SNMP connection request to the management information base;
whereby the switch generates an SNMP trap message based on the comparison; and,
generating an alert based on the SNMP trap message.

12. The appliance of claim 1 wherein the memory further contains instructions that when executed by the processor cause the appliance to carry out the steps of:
receiving a first firmware list for a device of the set of endpoint devices;
comparing the first firmware list to a second firmware list;
generating a report based on the comparison;
generating a remedial command based on the comparison; and,
sending the remedial command to the switch.

13. A method of monitoring a set of endpoint devices, operatively connected to a switch, by an appliance operatively connected to the switch, the method comprising:
detecting a count of endpoint devices in the set of endpoint devices;
dynamically allocating, based on the count of endpoint devices, temporary memory for each mirroring and processing cycle to reduce switch processing burden;
wherein each mirroring and processing cycle comprises:
receiving a set of mirrored data streams from the switch,
dividing the set of mirrored data streams into a set of groups, and
analyzing, in a time division multiple access (TDMA) format, each group of the set of groups individually for a predetermined condition; and,
generating an error message upon detection of the predetermined condition.

14. The method of claim 13 further comprising the steps of:
generating a remedial command based on the predetermined condition; and,
sending the remedial command to the switch.

15. The method of claim 13 further comprising the steps of:
identifying a first SSRC from a first datagram packet;
identifying a second SSRC from a second datagram packet;
comparing the first SSRC to the second SSRC;
incrementing a counter based on the comparison; and,
reporting an error if the counter exceeds a predetermined number.

16. The method of claim 13 further comprising the steps of:
identifying a video bit rate from the set of mirrored data streams;
determining whether or not the video bit rate is less than or equal to zero; and,
reporting an error if the video bit rate is less than or equal to zero.

17. The method of claim 13 further comprising the steps of:
identifying an audio bit rate from the set of mirrored data streams;
determining whether or not the audio bit rate is less than or equal to zero; and,
reporting an error if the audio bit rate is less than or equal to zero.

18. The method of claim 13 further comprising the steps of:
isolating a first data stream from the set of data streams using an SSRC;
analyzing the first data stream for a media parameter;
analyzing the first data stream for a quality parameter;
analyzing the first data stream for a rule violation; and,
sending an alert based on one of the group of the media parameter, the quality parameter and the rule violation.

19. The method of claim 13 wherein a user device is operatively connected to the appliance and further comprising the steps of:
receiving a list of chosen MAC address IDs from the user device;
receiving a list of chosen UDP/TCP ports from the user device;
generating a filter instruction based on the list of chosen MAC address IDs and the list of the chosen UDP/TCP ports;
sending the filter instruction to the switch;
whereby the mirrored data streams in a group of the set of groups are filtered.

20. The method of claim 13 wherein a user device is operatively connected to the appliance and further comprising the steps of:
receiving a list of services to enable;
receiving a list of devices to enable;
receiving a list of protocols to enable;
receiving a port range to enable;

generating an enable command including the services to enable, the devices to enable, the protocols to enable and the port range;

sending the enable command to the switch; and, whereby a set of services identified in the list of services to enable, a set of devices identified in the list of devices to enable, a set of protocols identified in the list of protocols to enable and a set of ports in the port range to enable are activated.

21. The method of claim 13 wherein a user device is operatively connected to the appliance and further comprising the steps of:

receiving an IPV4 address list from the user device;

receiving an IANA restricted address list from the user device;

generating a restriction command based on the IPV4 address list and the IANA restricted address list; and, sending the restriction command to the switch, whereby an IPV4 address and an IANA restricted address are activated for use.

22. The method of claim 13 wherein a user device is operatively connected to the appliance and further comprising the steps of:

receiving a current device password; receiving a forbidden password list and a set of rules;

comparing the current password to the forbidden password list and the set of rules;

generating a command message based on the comparison; and, sending the command message to the switch.

23. The method of claim 13 wherein a user device is operatively connected to the appliance and further comprising the steps of:

establishing an SNMP connection with the switch;

generating a command to filter MAC address by a management information base;

sending the command to the switch;

whereby the switch compares an SNMP connection request to the management information base;

whereby the switch generates an SNMP trap message based on the comparison; and, generating an alert based on the SNMP trap message.

24. The method of claim 13 wherein a user device is operatively connected to the appliance and further comprising the steps of:

receiving a first firmware list for a device of the set of endpoint devices;

comparing the first firmware list to a second firmware list;

generating a report based on the comparison;

generating a remedial command based on the comparison; and, sending the remedial command to the switch.

* * * * *